(12) United States Patent
Amirparviz

(10) Patent No.: US 8,666,208 B1
(45) Date of Patent: Mar. 4, 2014

(54) MOLDABLE WAVEGUIDE WITH EMBEDDED MICRO STRUCTURES

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 609 days.

(21) Appl. No.: 12/940,687

(22) Filed: Nov. 5, 2010

(51) Int. Cl.
| | |
|---|---|
| G02B 6/26 | (2006.01) |
| G02B 6/42 | (2006.01) |
| G02B 6/00 | (2006.01) |
| G02B 6/10 | (2006.01) |
| G02B 23/12 | (2006.01) |

(52) U.S. Cl.
CPC .. *G02B 6/00* (2013.01); *G02B 6/10* (2013.01); *G02B 23/125* (2013.01)
USPC .............................................. 385/31; 385/47

(58) Field of Classification Search
CPC .......................................................... G02B 3/00
USPC .................................. 385/31, 47, 134; 349/13
See application file for complete search history.

(56) References Cited

U.S. PATENT DOCUMENTS

| | | | | |
|---|---|---|---|---|
| 6,747,611 | B1* | 6/2004 | Budd et al. | 345/7 |
| 7,949,214 | B2* | 5/2011 | Dejong | 385/31 |
| 8,362,974 | B2* | 1/2013 | Miyake et al. | 345/8 |
| 2002/0176173 | A1* | 11/2002 | Song | 359/630 |
| 2006/0132914 | A1* | 6/2006 | Weiss et al. | 359/462 |
| 2011/0109528 | A1* | 5/2011 | Mun et al. | 345/8 |
| 2012/0062998 | A1* | 3/2012 | Schultz et al. | 359/630 |

OTHER PUBLICATIONS

Cakmakci, Ozan and Rolland, Jannick, "Head-Worn Displays: A Review" (preprint version), Invited paper, IEEE/OSA Journal of Display Technology, 2(3), Sep. 2006.
H. Mukawa et al., "A Full Color Eyewear Display Using Holographic Planar Waves," 2008 SID Symposium Digest of Technical Papers, vol. 39, Issue 1, pp. 89-92, 2008.
T. Levola, "Diffractive Optics for Virtual Reality Displays," J. Soc. Inf. Display, vol. 14, Issue 5, pp. 467-475, 2006 (preprint version).

* cited by examiner

*Primary Examiner* — Charlie Peng
*Assistant Examiner* — Mary El Shammaa
(74) *Attorney, Agent, or Firm* — McDonnell Boehnen Hulbert & Berghoff LLP

(57) ABSTRACT

A waveguide suitable in form factor and weight for use in a heads-up display or similar wearable display and a method of manufacturing the waveguide are disclosed. The waveguide comprises a waveguide body of light-weight, optically transparent solid material, such as plastic, with a series of micro structures embedded in the waveguide body at a top surface of the waveguide body. A first set of the micro structures near one end of the waveguide body serves to couple light into the waveguide, whereby a portion of the coupled light propagates subject to total internal reflection toward a second set of micro structures that reflects a portion of the propagated light out of the waveguide at a bottom surface of the waveguide body. The waveguide can deliver an image provided by an input light source to a human eye (or other detector) situated near the bottom surface of the waveguide body. In particular, the source image can be focused at infinity so that it appears in focus as viewed by the eye at the output of the waveguide. Methods for simple and inexpensive mass production of the waveguide are also disclosed.

32 Claims, 10 Drawing Sheets

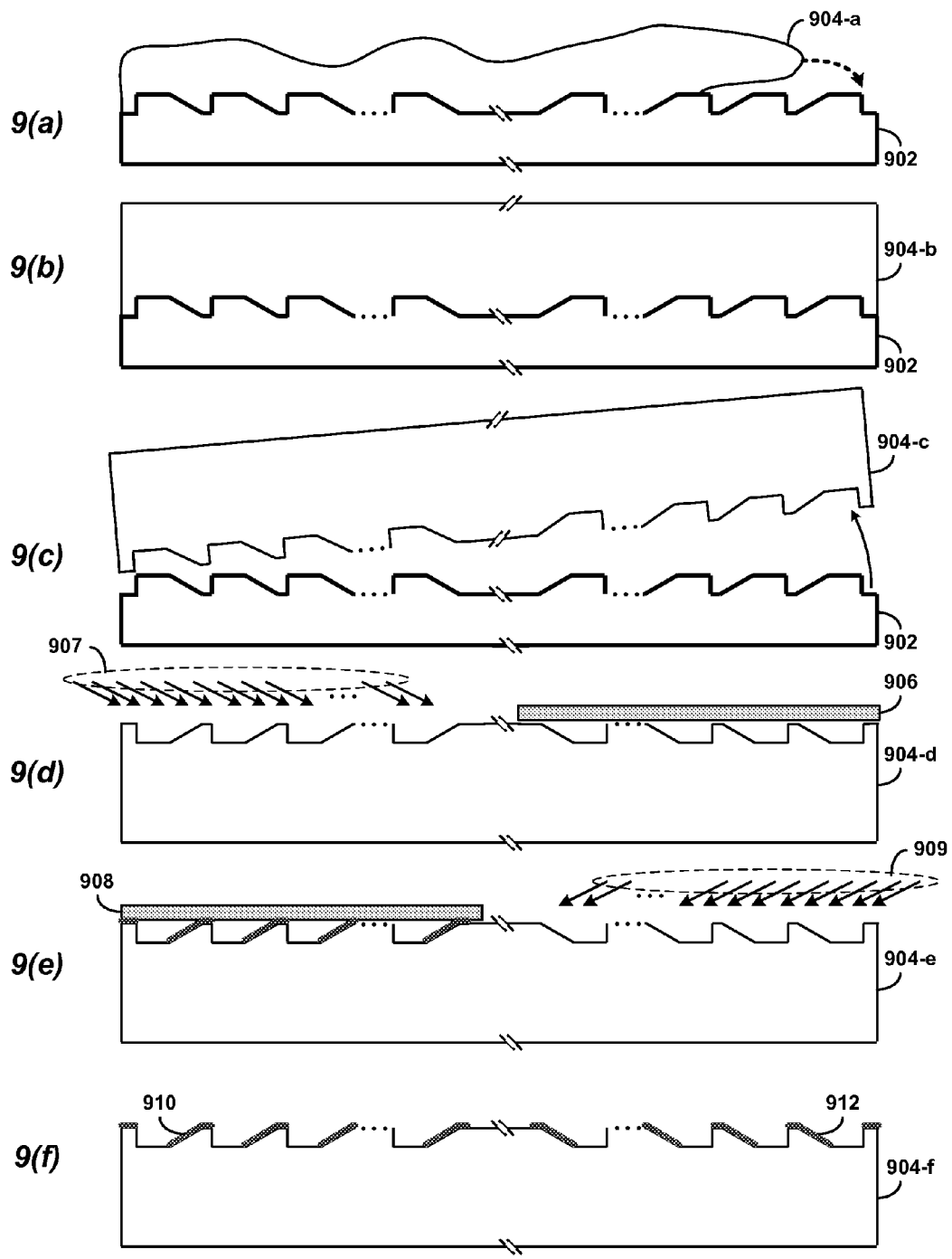
Fig. 9(a)-(f)

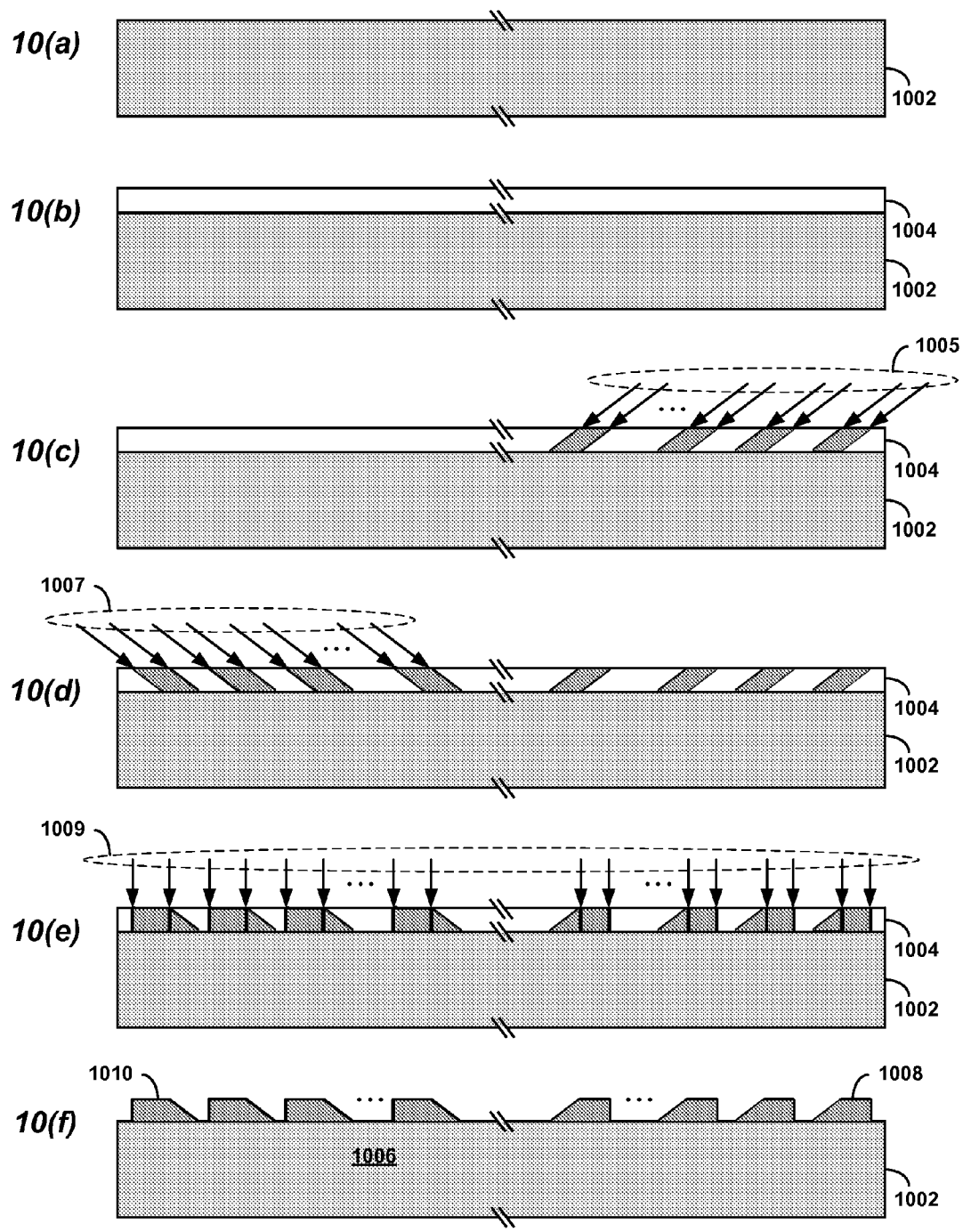
Fig. 10(a)-(f)

MOLDABLE WAVEGUIDE WITH EMBEDDED MICRO STRUCTURES

BACKGROUND

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology is commonly referred to as "near-eye displays."

Near-eye displays are fundamental components of wearable displays, also sometimes called "heads-up displays." Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. The applications of wearable displays are expected to grow as the technology improves.

Among the challenges of creating heads-up or wearable displays are size and weight of the display components and of the integrated display made from them. For practical and/or anticipated applications, it is desirable for the components of wearable displays to be small and light-weight. To help pave the way for consumer adoption of wearable displays, it is further desirable that the components be relatively inexpensive and easy to manufacture.

One of the physical components of a heads-up display is an optical transport element that delivers an image, such as one generated by a graphics processor or the like, to one or both of the wearer's eyes. In addition to meeting the challenges of size, weight, and manufacture, the optical transport component should have optical characteristics that efficiently couple light in and out of the component and retain the fidelity of transported images.

Existing components having adequate optical performance characteristics have either been too large or too expensive and difficult to manufacture for practical use, or both. Conversely, components made sufficiently small or cheaply to be considered practical have forfeited too much in the way of optical performance. The devices so far devised for possible use as optical transport in a wearable display fall short of coupling-efficiency and/or image-quality requirements, are too large or heavy for integration into a wearable display, or are too expensive or too difficult to manufacture on a practical scale.

One approach has been to use dichroic mirrors to reflect different wavelength ranges of light into and out of a waveguide. However, the size and weight of such mirrors has resulted in a bulky optical component. Moreover, dichroic mirrors require very precise deposition of dielectric multilayer films. This, in turn, translates into high cost and difficulty in mass production, which, combined with the sub-optimal size and weight characteristics, makes dichroic mirrors an unattractive option for coupling elements in wearable displays.

Another approach has been to use a diffraction grating for the in-coupling and out-coupling elements. While this may make it possible to accommodate the size and weight requirements of a waveguide for wearable displays, diffraction can result in color separation and other forms of image degradation. Additionally, since the size scale of diffractive elements of a grating are similar to the optical wavelengths being diffracted, high precision—and correspondingly high cost—is required in manufacture. Alternatively, lower manufacturing cost may be achieved at the expense of precision, but also at the expense of coupling efficiencies and optical performance (i.e., image quality).

SUMMARY

In order to overcome these and other challenges and design constraints recognized herein, a careful and thorough analysis of the physical processes that underlie the technical problems faced has been conducted. Accordingly, an example solution for the optical transport element of wearable displays is disclosed herein by way of example in the form of a small, light-weight optical waveguide having embedded micro-optical structures. Micro-optical structures in this example are those having linear dimensions in a range of approximately 10 microns to 1,000 microns, wherein one micron ($\mu$m) is defined as equaling $10^{-6}$ meters. Sizes in this range are tens to several hundreds of times larger than the typical wavelengths of light, which spans approximately 0.38 $\mu$m to 0.75 $\mu$m. For light interacting with micro-optical structures, and in particular, reflecting off surfaces having micro-optical dimensions, the effects of diffraction can be small to nearly vanishing. As such, reflection of light off surfaces having dimensions sufficiently large compared with the light wavelengths to render diffraction effects small to nearly vanishing is referred to herein as "non-diffractive" reflection. In this size regime, the behavior of light can be understood predominantly in terms of geometrical optics.

Both an example embodiment of a waveguide having embedded micro-optical structures and an example method of manufacturing the waveguide are described herein. In the example embodiment, the embedded structures comprise grooves formed in the surface of the waveguide and having reflecting surfaces of micro-optical dimensions. The example embodiments disclosed herein are not intended to be limiting with respect the device or the method of manufacture. Moreover, the applicability of the example device and/or its equivalents is not necessarily limited to use only in heads-up and/or wearable displays. Accordingly, such displays should be understood to represent but one of many possible uses of the disclosed waveguide and/or its equivalents.

Hence in one respect, an example embodiment presented herein provides an optical waveguide comprising: a waveguide body having a top surface and an opposite bottom surface, a first side and an opposite second side; a plurality of in-coupling non-diffractive reflecting surfaces embedded in the waveguide body at the top surface, each being oriented to reflect light that enters the waveguide body through the bottom surface onto one or more internal paths inside the waveguide body and toward the second side; and a plurality of out-coupling non-diffractive reflecting surfaces embedded in the waveguide body at the top surface, each being oriented to reflect light incident from the one or more internal paths onto one or more exit paths that exit the waveguide body through the bottom surface.

In another respect, the example embodiment presented herein provides an optical waveguide comprising: an optically-transparent waveguide body having a top surface and an opposite bottom surface, a first side and an opposite second side; a sequence of parallel in-coupling grooves formed in the top surface of the waveguide body and situated between the first side and the second side, each in-coupling groove having an in-coupling reflecting surface with dimensions in comparison with the wavelengths of light that renders the in-coupling reflecting surface non-diffractively reflective, and each in-coupling reflecting surface being oriented to reflect light that enters the waveguide body through the bottom surface onto one or more internal paths inside the waveguide body and toward the second side; and a sequence of parallel out-coupling grooves formed in the top surface of the waveguide body parallel to the sequence of in-coupling grooves and situated between sequence of in-coupling grooves and the second side, each out-coupling groove having an out-coupling reflecting surface with dimensions in comparison with the wavelengths of light that renders the out-coupling reflecting surface non-diffractively reflective, and each out-coupling reflecting surface being oriented to reflect light incident from the one or more internal paths to one or more exit paths that exit the waveguide body through the bottom surface.

In yet another respect, the example embodiment presented herein provides a method of manufacturing an optical waveguide, the method comprising: forming a molding die comprising a base surface with a first edge and a second edge, the molding die further comprising a sequence of parallel in-coupling ridges affixed to the base surface between the first edge and the second edge, and a sequence of parallel out-coupling ridges affixed to the base surface parallel to the sequence of in-coupling ridges and situated between the sequence of in-coupling ridges and the second edge, each of the in-coupling ridges and each of the out-coupling ridges having a ridge surface with dimensions that, relative to the wavelengths of light, correspond in size to a non-diffractive reflecting surface; coating the molding die with a layer of optically transparent moldable waveguide material to form a molded waveguide body, the molded waveguide body having a molded face formed against the molding die and a flat face opposite the base surface, wherein the molded face has a sequence of parallel in-coupling grooves extending into the molded waveguide body and corresponding in inverse shape to the sequence of parallel in-coupling ridges, and a sequence of parallel out-coupling grooves extending into the molded waveguide body and corresponding in inverse shape to the sequence of parallel out-coupling ridges; removing the molded waveguide body from the molding die, the removed molded waveguide body retaining the molded face, the flat face, the sequence of parallel in-coupling grooves, and the sequence of parallel out-coupling grooves; applying a reflective coating to an in-coupling surface of each in-coupling groove of the sequence of parallel in-coupling grooves, the reflectively-coated in-coupling surface having dimensions in comparison with the wavelengths of light that renders the reflectively-coated in-coupling reflecting surface non-diffractively reflective, and being oriented to reflect light that enters the waveguide body through the flat face onto one or more internal paths inside the waveguide body and toward the sequence of parallel out-coupling grooves; and applying a reflective coating to an out-coupling surface of each out-coupling groove of the sequence of parallel out-coupling grooves, the reflectively-coated out-coupling surface having dimensions in comparison with the wavelengths of light that renders the reflectively-coated out-coupling reflecting surface non-diffractively reflective, and being oriented to reflect light incident from the one or more internal paths to one or more exit paths that exit the waveguide body through the flat face.

In still another respect, the example embodiment presented herein provides a molding die for manufacturing at least one optical waveguide, the molding die comprising: a base surface with a first edge and a second edge; a sequence of parallel in-coupling ridges affixed to the base surface between the first edge and the second edge, and a sequence of parallel out-coupling ridges affixed to the base surface parallel to the sequence of in-coupling ridges and situated between the sequence of in-coupling ridges and the second edge, each of the in-coupling ridges and each of the out-coupling ridges having a ridge surface with dimensions that, relative to the wavelengths of light, correspond in size to a non-diffractive reflecting surface, wherein the molding die is configured to imprint a shape into a layer of optically transparent moldable waveguide material, the shape comprising an inverse shape of the base surface, an inverse shape of the sequence of parallel in-coupling ridges, and an inverse shape of the sequence of parallel out-coupling ridges, and the layer, including the imprinted shape, comprising an optical waveguide, wherein the at least one optical waveguide is characterized by (i) an optically-transparent waveguide body having a top surface and an opposite bottom surface, a first side and an opposite second side, and (ii) a sequence of parallel in-coupling grooves and a parallel sequence of parallel out-coupling grooves formed in the solid material of the waveguide body at the top surface, each in-coupling groove having an in-coupling reflecting surface with dimensions in comparison with the wavelengths of light that renders the in-coupling reflecting surface non-diffractively reflective, and each in-coupling reflecting surface being oriented to reflect light that enters the waveguide body through the bottom surface onto one or more internal paths inside the waveguide body and toward the second side, and each out-coupling groove having an out-coupling reflecting surface with dimensions in comparison with the wavelengths of light that renders the out-coupling reflecting surface non-diffractively reflective, and each out-coupling reflecting surface being oriented to reflect light incident from the one or more internal paths to one or more exit paths that exit the waveguide body through the bottom surface, wherein the base surface of the molding die corresponds in inverse shape to the top surface of the waveguide body, wherein and the affixed sequence of parallel in-coupling ridges corresponds in inverse shape to the sequence of parallel in-coupling grooves, and wherein and the affixed sequence of parallel out-coupling ridges corresponds in inverse shape to the sequence of parallel out-coupling grooves.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

FIG. 9(a)-(f) illustrates in conceptual form the steps of an example embodiment of a method of manufacturing an example optical waveguide.

FIG. 10(a)-(f) illustrates in conceptual form the steps of an example embodiment of a method of forming an example molding die that can be used in an example method of manufacturing an optical waveguide according to the example embodiment.

DETAILED DESCRIPTION

1. Example Embodiment of an Optical Waveguide in a Wearable Display

Figure 1:
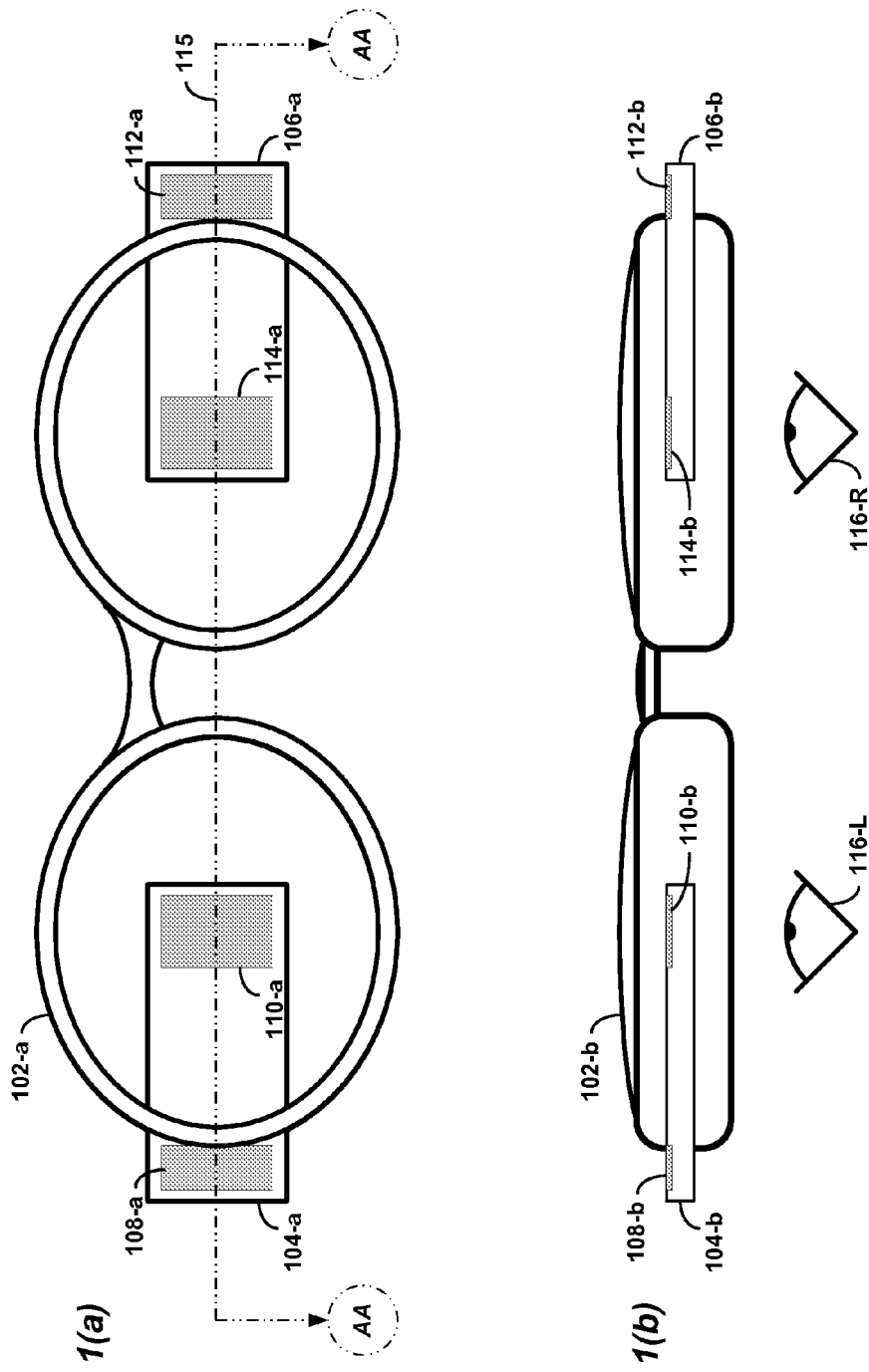
FIG. 1(a)-(b) illustrates an example configuration of certain aspects of a wearable display, including an example embodiment of optical waveguides for delivering one or more images to a user of the wearable display.

An example embodiment of an optical waveguide having embedded micro-optical structures is depicted as a component of an example wearable display in FIG. 1. The illustration is not intended to necessarily depict a complete wearable display, but rather an example configuration of optical waveguides in such a display. It will be appreciated that there could be additional components, which for the sake of brevity in the figure, are not shown here.

FIG. 1(a) illustrates a front view of the wearable display. The front view corresponds to the viewing direction of the wearer (user). The wearable display includes a goggle portion 102-a, a first optical waveguide 104-a extending into the field of the left-side goggle lens area, and a second optical waveguide 106-a extending into the field of the right-side goggle lens area. In accordance with the example embodiment, both waveguides are made of a light-weight, solid, optically-transparent material. Examples of such a material include polydimethylsiloxane (PDMS) and acrylic. It will be appreciated that there are other materials, such as various optically transparent plastics, with suitable optical characteristics. In the context of a wearable display, light-weight is taken to correspond to a mass of approximately 100 grams, although this should be viewed as setting an approximate mass and not a strict specification or limit with respect to the example embodiment.

The first optical waveguide includes an in-coupling region 108-a and an out-coupling region 110-a. Likewise, the second optical waveguide includes an in-coupling region 112-a and an out-coupling region 114-a. In practice, one or more images or forms of light sources are supplied to the example waveguide via the in-coupling regions. For example, images may be generated by a portable (wearable) image processor (not shown), and coupled to the in-coupling regions by one or more focusing lens (also not shown) that collimate the light of the images. The process providing the images may also include projecting a pre-processed image to help reduce image artifacts and illumination non-uniformities. The in-coupled images are transported on one or more light paths within each waveguide, and are delivered or presented to the user's eye in the form of a display via the out-coupling regions. In addition, the out-coupling regions may be partially transparent in order to allow the user to view to nearly any distance in front of the display that would be viewable in the absence of the waveguide.

FIG. 1(b) shows a cross-sectional view from the top. This view corresponds to the section marked by the dotted-dashed line 115 and the cut-away arrows pointing to the "AA" view section labels in FIG. 1(a). The elements shown in FIG. 1(b) are the same as those in FIG. 1(a), except the item labels end in "-b" instead of "-a". FIG. 1(b) also includes a representation of the user's left eye 116-L and right eye 116-R for orientational reference.

As shown in the cross-sectional view of FIG. 1(b), the example waveguides 104-b and 106-b are relatively thin, fitting within the thickness of the example goggle portion 102-b. This view also illustrates the narrowness both of the in-coupling regions 108-b and 112-b and of the out-coupling regions 110-b and 114-b. In accordance with the example embodiment, the respective depths of the in-coupling and out-coupling regions are only a fraction of the thickness of the waveguide as viewed in FIG. 1(b). It should be understood that the relation of the depths of the in-coupling and out-coupling regions to the thickness of the example waveguide are not necessarily shown to scale in the illustration of FIG. 1(b).

In accordance with the example embodiment, the in-coupling regions 108-a,b, 112-a,b and the out-coupling regions 110-a,b, 114-a,b include reflecting surfaces of micro-optical dimensions. Certain paths of light entering the waveguide substantially within the in-coupling region 108-a,b, 112-a,b are reflected by one or more in-coupling reflecting surfaces onto one or more internal paths within the waveguide 104-a, b, 106-a,b. The internal paths may include paths of total internal reflection, which, as is known in the art, are paths that remain within a waveguide by reflection off the inside of one or another surface that bounds the volume of the waveguide. At least a portion of the in-coupled light travels toward the out-coupling region 110-a,b, 114-a,b whereupon some of it is reflected by one or more out-coupling reflecting surfaces onto one or more exit paths that exit the waveguide 104-a,b, 106-a,b substantially in a direction of the observing eye 116-R,L (or possibly a form of technology-based detector).

As is known in the art, micro-optical sizes correspond to linear dimensions in a range of approximately 10 μm to 1,000 μm, although this range does not necessarily define strict upper or lower bounds. In the context of the example embodiments described herein and with respect to the wavelengths typically attributed to light (e.g., approximately 0.38 μm to 0.75 μm), micro-optical sizes may also be understood operationally as referring to surfaces with dimensions sufficiently large compared with the wavelengths of light so that reflection of light off the surfaces is non-diffractive. In this size regime, corresponding to ratios of wavelength to characteristic size of the reflecting surface that are smaller than one, diffraction effects can be small to nearly vanishing. Hence the term "non-diffractive" reflection. It will be appreciated, however, that since the particular amount of diffraction in any given instance depends on the specific wavelength involved and the specific dimensions of the reflecting surface (or more generally of the diffracting object), there will typically not be a complete absence of diffraction. Accordingly, non-diffractive reflection should be understood as applying to the size regime for which diffraction effects are small to nearly vanishing, but not necessarily completely absent.

Because both the in-coupling and out-coupling reflecting surfaces have dimensions in a range of micro-optical sizes, the behavior of the reflected light can also be understood and described predominantly according to geometrical optics. For non-diffractive reflection, color separation can be relatively small or even vanishing, depending on the specific sizes of the reflecting surfaces relative to the wavelength of light being reflected. More particularly, in the regime of geometrical optics, reflection will generally occur with little or virtually no color separation, and light paths behave largely as rays. This not only makes the optical characteristics and properties of the waveguide particularly advantageous for applications in wearable displays, but it also lends to relatively simple and straightforward analysis of performance and design. Further details of the micro-optical reflecting surfaces embedded in the example waveguide are discussed below.

In addition to depicting some of the physical and mechanical aspects of an example wearable display employing the example embodiment of optical waveguides, FIG. 1 also serves to illustrate certain size scale constraints of such a wearable display, as well as certain operational concepts. In particular, a wearable display including the integrated waveguides should not be significantly bigger than just the goggle portion alone. While the actual relative sizes of the goggles and waveguides will vary depending on the particular application, the waveguides should be small enough so as not to render the example integrated system too large to wear. As indicated above, the desired size characteristics apply to the example waveguide mass as well. By way of example, a wearable display could be as small as a pair of common sunglasses, or as large as a helmet for a space suit. It will be appreciated that these examples give only an approximate of size range, and are not intended to set strict lower or upper limits of size of a wearable display or limit the example embodiment.

Regarding operational aspects of the example waveguide, the size of the out-coupling region 110-a, 114-a as viewed by the user's eye (i.e., as FIG. 1(a)) is dimensioned according to what is commonly termed an "eye motion box." When, looking at a forward-viewing scene, such as an TV image, a museum painting, or the like, the eye, as is known, naturally moves about—up and down and side-to-side. The eye motion box corresponds to an area within which the forward-viewing scene is perceived to remain substantially unchanged as the eye goes through its natural motions. In accordance with the example embodiment, the area of the out-coupling region 110-a 114-a of the optical waveguide 104-a, 106-a will be dimensioned to accommodate at least a typical eye motion box placed one to a few millimeters in front of the eye (i.e., a displacement corresponding to a wearable display), while also meeting other size and operational constraints.

In further accordance with the example embodiment, the size of the in-coupling region 108-a, 112-a will be dimensioned to couple in sufficient light to yield an image with a quality at least commensurate with the particular application of the example waveguide and/or of the example wearable display. For example, the determination of the size of the area of the in-coupling region 108-a, 112-a will take account of coupling efficiencies into and out of the example waveguide, as well as optical transport efficiencies. The requisite or desired image quality may depend on such factors as the type of information displayed and context in which the example wearable display is used. For instance, use in safety-critical missions, such as public safety applications, might require higher image quality than use in a consumer gaming context. Other examples of application and use are possible as well.

2. Example Embodiment of a Waveguide with Micro-Optical Reflecting Grooves

Figure 2:
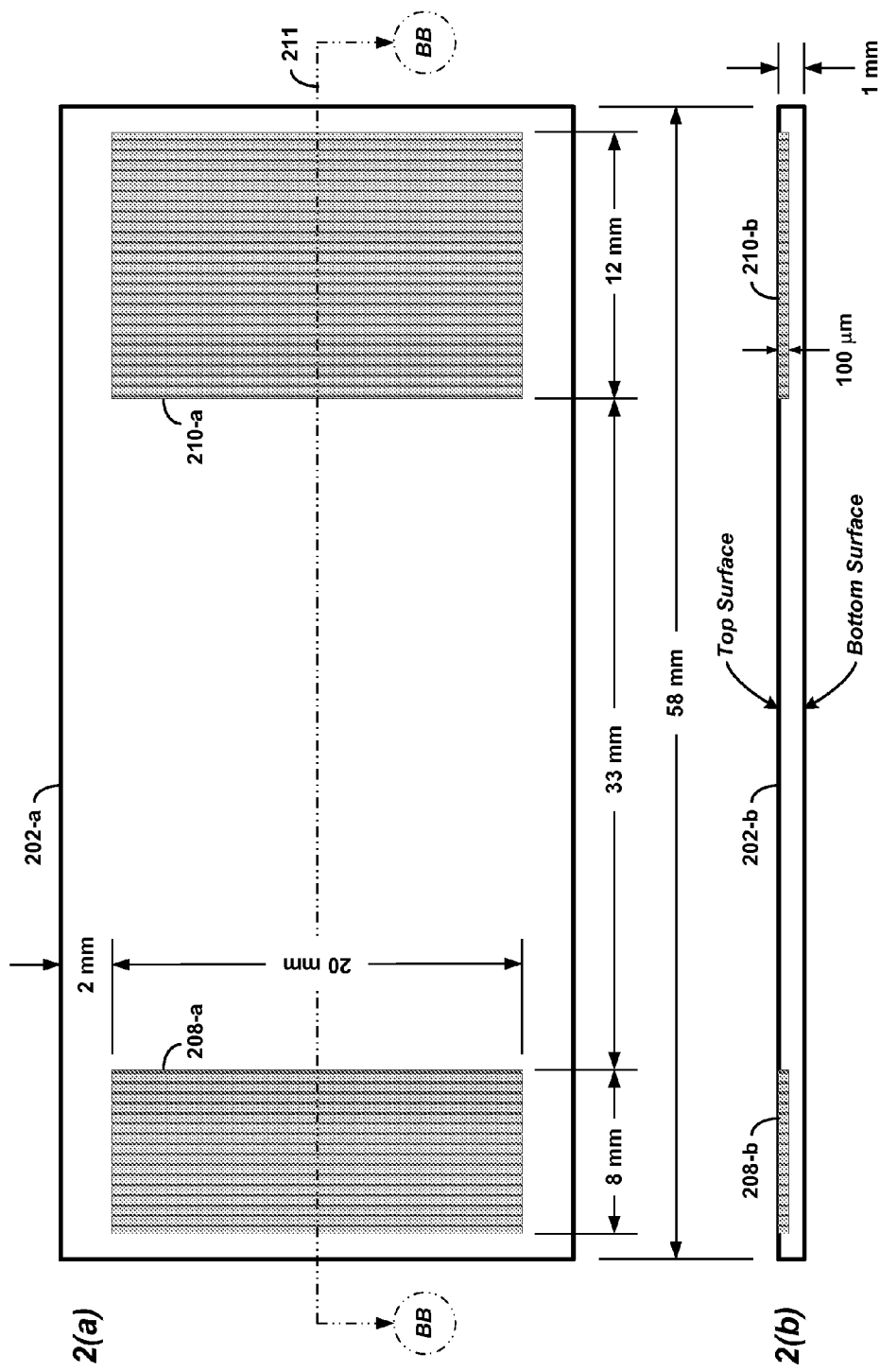
FIG. 2(a)-(b) illustrates certain dimensional and structural characteristics of an optical waveguide according to an example embodiment.

The in-coupling and out-coupling reflecting surfaces of the example embodiment constitute portions of surfaces of parallel grooves etched or molded into the surface of the example waveguide. FIG. 2 shows two views of an enlargement of the example waveguide, including an illustration of the in-coupling and out-coupling grooves represented schematically as parallel lines.

FIG. 2(a) illustrates a face-on view of a top surface of the example waveguide 202-a. This corresponds to the same viewing orientation as FIG. 1(a). An in-coupling region 208-a is shown face-on at the left side, and an out-coupling region 210-a is shown face-on at the right side. The vertical parallel lines in both the in-coupling region 208-a and the out-coupling region 210-a represent the parallel grooves extending lengthwise along the directions of the lines. For purposes of the discussion herein and clarity of definition, the in-coupling region 208-a is taken to be a sequence of parallel in-coupling grooves, and the out-coupling region 210-a is taken to be a sequence of parallel out-coupling grooves. The number of lines depicted in FIG. 2(a) as representing the grooves in each sequence is, for illustrative purposes of the figure, arbitrary; more particular numbers of grooves in the example embodiment are specified below.

FIG. 2(b) shows a cross-sectional view in thickness of the example waveguide 202-b. This view corresponds to the section marked by the dotted-dashed line 211 and the cut-away arrows pointing to the "BB" view section labels in FIG. 2(a). As with FIG. 1(b), the elements shown in FIG. 2(b) are the same as those in FIG. 2(a), except the item labels end in "-b" instead of "-a". FIG. 2(b) includes a label and arrow indicating the top surface of the example waveguide 202-b, and a label and arrow indicating the bottom surface of the example waveguide 202-b, both surfaces being viewed edge-on. With these designations, it may be seen that the in-coupling region 208-b and the out-coupling region 210-b are formed in the top surface. Both the in-coupling region 208-b and the out-coupling region 210-b are again depicted as thin compared with the thickness of the example waveguide 202-b. In this cross-sectional view, the short parallel lines representing the in-coupling and out-coupling grooves depict groove depth. It should be understood that the degree of enlargement represented in FIG. 2 is not intended to be sufficient to necessarily make it possible to discern the width or cross-sectional shape of the grooves (i.e., in the horizontal direction in the figure).

In accordance with the example embodiment, the example waveguide 202-a,b illustrated in FIG. 2 is a regular rectangular block with mutually orthogonal dimensions of length, width, and thickness (or height). By way of example, particular values of these dimensions and of the sizes and positions of the in-coupling region 208-a,b and the out-coupling region 210-a,b are given in the figure. Specifically, the length, width, and thickness of the example waveguide are approximately equal to 58 mm, 24 mm, and 1 mm (1,000 µm), respectively. The length of each groove, measured parallel to the width dimension of the example waveguide 202-a is approximately equal to 20 mm (cf., FIG. 2(a)). The width of the in-coupling region 208-a,b measured parallel to the length dimension of the example waveguide 202-a,b is approximately equal to 8 mm, and the width of the out-coupling region 210-a,b also measured parallel to the length dimension of the example waveguide 202-*a,b* is approximately equal to 12 mm. The in-coupling region 208-*a,b* and the out-coupling region 210-*a,b* are separated by approximately 33 mm along a direction parallel to the length of the example waveguide 202-*a,b*. Finally, the depth of the in-coupling and out-coupling grooves (cf., FIG. 2(*b*)) is approximately equal to 100 μm (0.1 mm). Again, the detailed cross-sectional shape of the grooves is not intended to be necessarily apparent from FIG. 2.

The particular sizes specified for the example waveguide 202-*a,b* are appropriate for the application of the example waveguide in a typical example wearable or heads-up display. However, it will be appreciated that the values are specified by way of example, and that other values could be used that remain within the scope and spirit of the example embodiment or variations thereof. Moreover, the actual dimensions achieved in practice may include some imprecision resulting from the manufacturing process, for example.

In addition, the form factor of the example waveguide 202-*a,b* need not be strictly a regular rectangular block. For example, the top and bottom surfaces could be curved in the length and/or width dimensions displayed in FIG. 2(*a*), or could include structural elements (e.g., notches, integrated brackets, etc.) for accommodating assembly in an example wearable display. Furthermore, while the top and bottom surfaces are planar in the example waveguide 202-*a,b*, the nature of reflection from micro-optical reflecting surfaces makes it possible to consider devising reflecting surfaces with orientations and shapes that accommodate waveguides with non-planar top and bottom surfaces. Such a waveguide might be curve in the length dimension displayed in FIG. 2(*b*). These example deviations from a regular rectangular block are not intended to be limiting with respect to the form factor of a waveguide of the example embodiment or variations thereof.

In view of the ranges of sizes and shapes that could be accommodated, the form factor of the example embodiment of the waveguide can be more generally described as a waveguide body of optically transparent solid material having a top surface and an opposite bottom surface. The waveguide body may be described as having a longitudinal dimension and a perpendicular lateral dimension, and further having a first side and a second side separated by a distance measured parallel the longitudinal dimension. While this description is consistent with a regular rectangular block, such as the one described above in connection with FIG. 2, it can also apply to other form factors as well.

In accordance with the example embodiment, the in-coupling region 208-*a,b* may be considered a sequence of parallel in-coupling grooves formed in the solid material of the waveguide body at the top surface and situated between the first and second sides of the waveguide body, wherein each in-coupling groove is oriented with a length $l_1$ perpendicular to the longitudinal dimension. Further, each in-coupling groove has a non-diffractive in-coupling reflecting surface (i.e., with dimensions in a size range corresponding to micro-optical sizes).

In a practical application of the example waveguide 202-*a,b*, an illumination source or image is arranged to enter the waveguide through the bottom surface on one or more entrance paths, in a region of area situated substantially underneath the in-coupling region 208-*a,b* in the overlaying top surface. Accordingly, the in-coupling reflecting surface of each in-coupling groove is shaped and oriented to reflect light on the one or more entrance paths to one or more internal paths inside the waveguide body, wherein each of the one or more internal paths traverses the waveguide in the general direction of the second side of the waveguide body. In geometric terms, each internal path has a vector component directed toward the second side and parallel to the longitudinal dimension. For many practical applications, a relative physical configuration of the example waveguide and the input from the illumination source will be arranged so that the entrance paths are substantially normal to the bottom surface, or predominantly so.

In further accordance with the example embodiment, the out-coupling region 210-*a,b* may be considered a sequence of parallel out-coupling grooves formed in the solid material of the waveguide body at the top surface parallel to the sequence of in-coupling grooves, wherein the sequence of out-coupling grooves is situated between the sequence in-coupling grooves and the second side. Additionally, each out-coupling groove is oriented with a length $l_2$ perpendicular to the longitudinal dimension. Each out-coupling groove also has a non-diffractive out-coupling reflecting surface (i.e., with dimensions in a size range corresponding to micro-optical sizes).

In a practical application of the example waveguide, the user's eye (or possibly a form of technology-based detector) is situated so as to view the bottom surface in a region of area substantially underneath the out-coupling region 210-*a,b* in the overlaying top surface. As described above, this region of area corresponds to the eye motion box. Accordingly, the example waveguide is arranged to deliver the image on one or more exit paths directed toward the user's eye, and generally within the eye motion box. More particularly, the out-coupling reflecting surface of each out-coupling groove is shaped and oriented to reflect light incident from the one or more internal paths to one or more of the exit paths. The internal optics of the waveguide and the out-coupling reflecting surfaces will be arranged so that the exit paths are normal to the bottom surface, or predominantly so.

Figure 3:
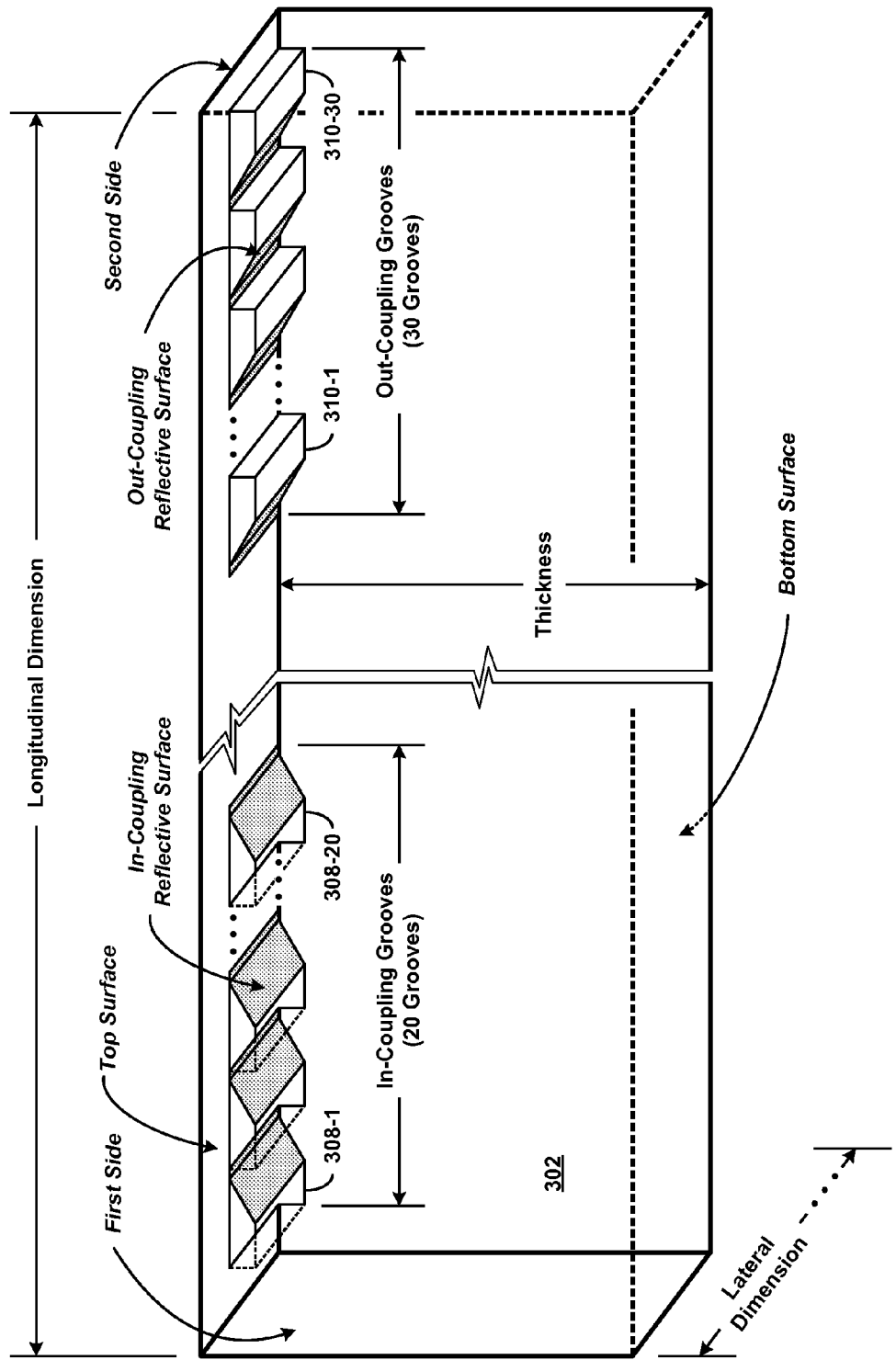
FIG. 3 is a three-dimensional rendering of a conceptual illustration of an example optical waveguide, depicting grooves and reflecting surfaces constructed and arranged according to the example embodiment.

A further enlarged depiction of the example waveguide is shown in FIG. 3, in the form of a three-dimensional rendering of the cross-sectional view of FIG. 2(*b*). In accordance with the example embodiment, the form factor of the example waveguide 302 in FIG. 3 is a regular rectangular block having (as indicated in the figure) a longitudinal dimension and a perpendicular lateral dimension in parallel, planar top and bottom surfaces that are separated by a thickness measured perpendicular to both surfaces. The waveguide body is marked by a first side (on the left in the figure) and a second side (on the right in the figure) separated by the longitudinal dimension. The full size of the lateral dimension extends beyond the width of the cutaway section of the example waveguide 302 in FIG. 3. In addition, in order to fit the enlarged view of the example waveguide in the figure, the longitudinal dimension of the waveguide body is abbreviated, as represented by broken-edge lines in the top and cutaway surfaces.

The further enlarged view of FIG. 3 shows the cross-sectional shape of the grooves of the example waveguide 302. In accordance with the example embodiment, there are 20 in-coupling grooves in the in-coupling region, and 30 out-coupling grooves in the out-coupling region. In order to fit the enlarged view of the grooves in the figure, only four of each of the in-coupling and out-coupling grooves are shown, with ellipses representing the remaining (but not shown) grooves. For the sake of brevity in the figure, only the first in-coupling groove 308-1 and last in-coupling groove 308-20 are labeled. Similarly, only the first out-coupling groove 310-1 and last in-coupling groove 310-30 are labeled.

In accordance with the example embodiment, and as illustrated in the figure, each in-coupling groove has, in cross-section, a vertical wall at the left that extends in depth from the top surface to a groove floor. The floor extends horizontally toward the right to a ramp that extends back up to the top surface. An inter-groove gap then separates the ramp-top of one groove from the wall of the next rightward groove. In further accordance with the example embodiment, and also as illustrated in the figure, each out-coupling groove has the same cross-sectional shape as the in-coupling grooves, except reflected about a plane perpendicular to the longitudinal dimension. That is, the wall is on the right side of the out-coupling groove, and the ramp and inter-groove gap is on the left side. Note that the directions of right and left are used here for orientation within the figure, and are not necessarily inherent properties of the example waveguide.

The reflecting surface of each groove comprises the ramp surface and the inter-groove gap surface of the groove, and is indicated in FIG. 3 by shading of these surfaces. Note that the reflective surface of only one in-coupling groove and only one out-coupling groove is labeled as such. In accordance with the example embodiment, the reflective surface is made reflective by a thin layer of reflective metal deposited on the ramp and on the inter-groove gap of each in-coupling and each out-coupling groove. By way of example the reflective metal is taken to be aluminum, and the layer thickness is approximately equal to 0.1 µm, although other layer thickness could be used.

Figure 4:
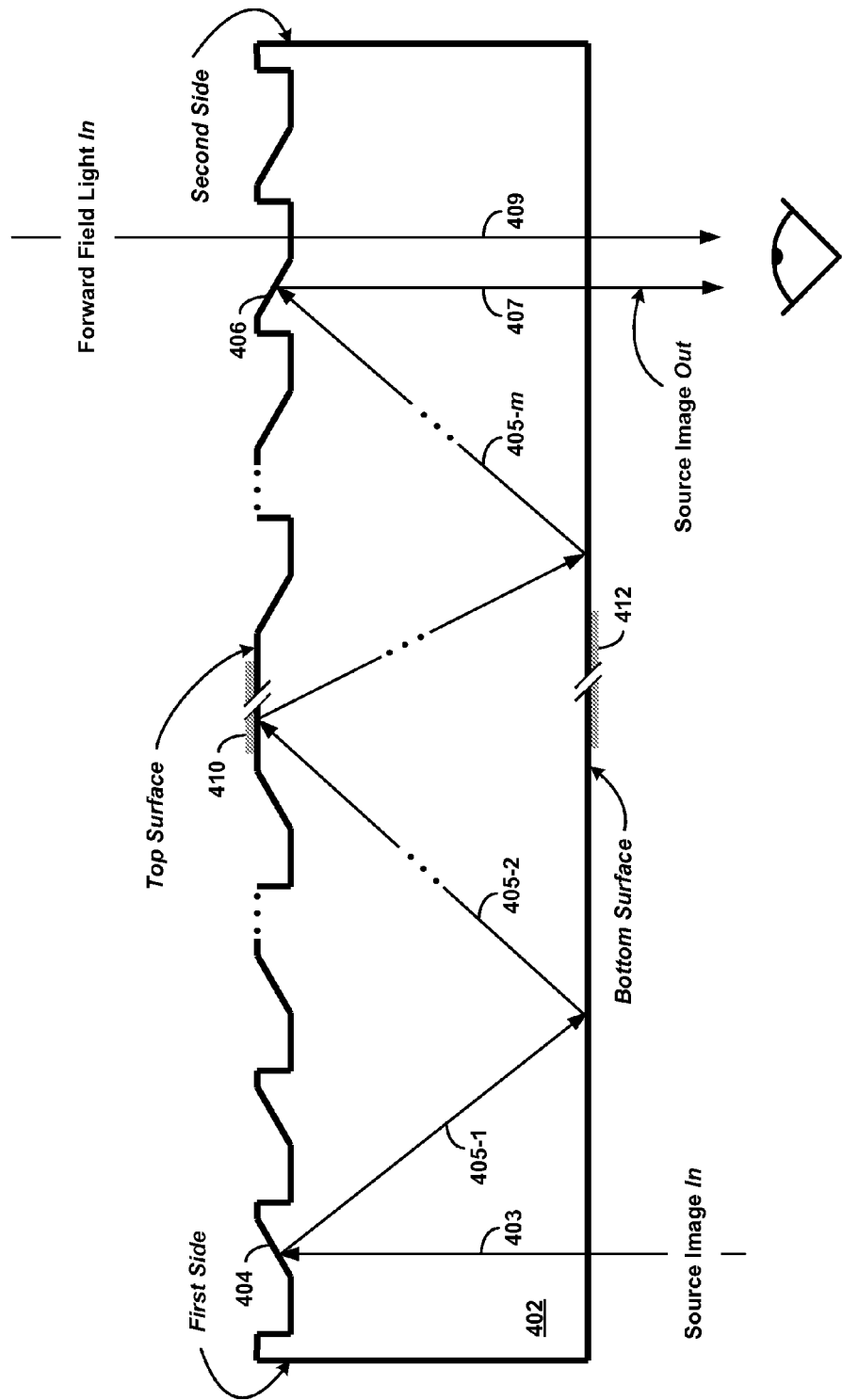
FIG. 4 is a conceptual illustration of various light paths into, within, and out of an example waveguide having reflecting surfaces constructed and arranged according to the example embodiment.

FIG. 4 illustrates the physical-optical principles of in-coupling and out-coupling in accordance with the example embodiment of an example waveguide 402, again viewed in cross-section. The broken lines in the top and bottom surfaces, and the ellipses in place of omitted grooves represent an abbreviation in the longitudinal dimension, purely for purposes of fitting the diagram on the page.

At the left, an illumination source or image enters through the bottom surface of the example waveguide 402 on an entrance path 403. Light on this path is reflected by the in-coupling reflective surface 404 to an internal path 405-1, which is then subject to total internal reflection as it traverses toward the out-coupling region on the right. By way of example, the internal path 405-1 reflects off the bottom surface onto internal path 405-2, which then reflects off the top surface, and so on as indicated by the ellipses in the paths. After a final internal reflection, internal path 405-$m$ is reflected by the out-coupling reflective surface 406 onto an exit path 407 that exits through the bottom surface of the example waveguide 402 and in the direction of the observing eye, as indicated. Note that the eye may simultaneously view the forward field in front of the top surface via the direct path 409 that passes directly through the floor section of an out-coupling groove and then continues through the example waveguide and out the bottom surface.

One of the important advantages illustrated by FIG. 4 of the example waveguide 402 is the application of relatively simple geometrical (or ray) optics in tracing the light paths into, within, and out of the example waveguide. This is possible because the reflecting surfaces of the in-coupling and out-coupling regions are non-diffractive, having dimensions of area that are in a range of micro-optical sizes. It will be appreciated that the particular paths illustrated in FIG. 4 are intended only as examples, and that many other paths can, and in practical usage, do enter, couple into, traverse, and couple out of the example waveguide. It should also be understood that the illustrated paths are schematic and representative of the optical concepts involved. As such, the angles of incidence and reflection in are not necessarily shown to scale in the figure or with a precision adequate for analytic interpretation.

The total internal reflection to which the internal paths are subject may be achieved in a number of ways. One, based on well-known principles of geometrical optics, just relies on the different respective indices of refraction of the example waveguide and of the air (or atmosphere) outside of the waveguide. Another is by deposition of a layer of reflective metal 410 on the top and/or 412 on the bottom surface in the region or zone between the in-coupling and out-coupling regions. Other types of coating layers, or claddings, may be used as well.

Figure 5:
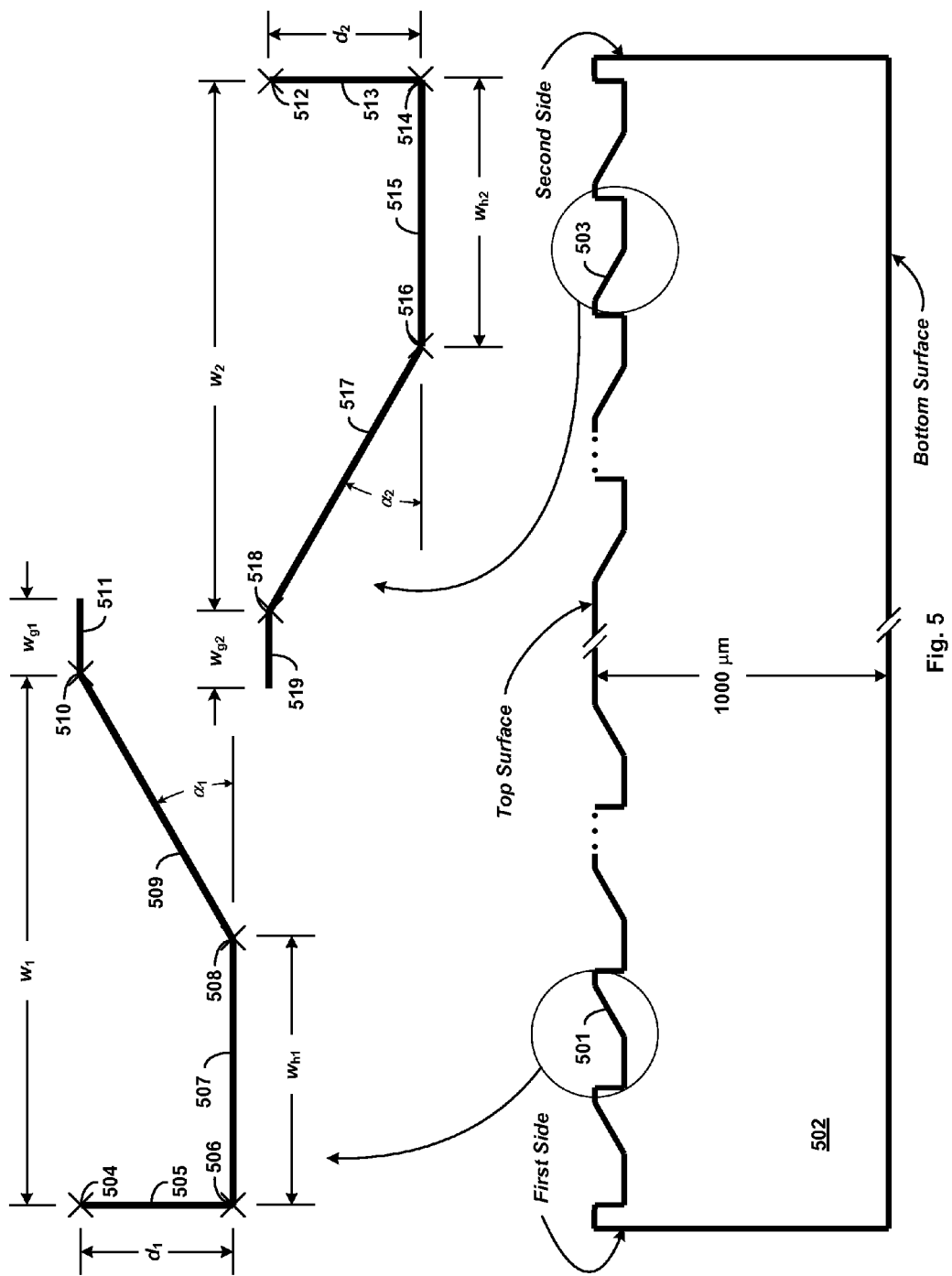
FIG. 5 is a schematic illustration of detailed shape characteristics and parameterized dimensions of in-coupling and out-coupling grooves of an example embodiment of an optical waveguide.

FIG. 5 illustrates a more detailed view of the cross-sectional shapes of the in-coupling and out-coupling grooves of an example waveguide 502. The example waveguide 502 depicts a cross-sectional view similar to that shown in FIG. 4. By way of example, the distance between the top and bottom surfaces is approximately equal to 1,000 µm. On the left of FIG. 5, a representative in-coupling groove 501, highlighted within a circle, is shown in a magnified view. On the right, a representative out-coupling groove 503, similarly highlighted within a circle, is shown in a magnified view. In the magnified views of FIG. 5, specific measurements of the cross-section elements of the in-coupling groove 501 and the out-coupling groove 503 are parameterized; particular numerical values are discussed later.

The magnified in-coupling and out-coupling grooves 501, 503 are each described in terms of four line segments and the vertices at which the line segments are connected. For purposes of the discussion herein, various fiducial points along the cross-section are marked by "X"s and define the following descriptive terms. For the in-coupling groove 501, fiducial points 504 and 510 mark a first in-coupling groove-edge point and a second in-coupling groove-edge point, respectively; and fiducial points 506 and 508 mark a first in-coupling groove floor point and a second in-coupling groove floor point, respectively. For the out-coupling groove 503, fiducial points 512 and 518 mark a first out-coupling groove-edge point and a second out-coupling groove-edge point, respectively; and fiducial points 514 and 516 mark a first out-coupling groove floor point and a second out-coupling groove floor point, respectively. With these definitions, the cross-sectional shape of the in-coupling and out-coupling grooves 501, 503 can be described as follows.

The width of the in-coupling groove 501 at the top surface, measured between the first in-coupling groove-edge point and the second in-coupling groove-edge point, is $w_1$, as indicated. A vertical segment 505 extends a distance $d_1$ in depth down from the first in-coupling groove-edge point to the first in-coupling groove floor point. A horizontal floor segment 507 at depth $d_1$ extends a distance $w_{h1}$ in width from the first in-coupling groove floor point to the second in-coupling groove floor point. As is evident from the figure, $w_{h1} < w_1$. Next, a first straight ramp segment 509 extends at an angle $\alpha_1$ from the second in-coupling groove floor point up to the second in-coupling groove-edge point at the top surface. Finally, a horizontal in-coupling groove gap segment 511 at zero depth of the top surface extends a distance $w_{g1}$ in width from the second in-coupling groove-edge point toward the second edge of the top surface (on the right in this figure).

A similar description applies to the out-coupling groove 503. Namely, the width of the out-coupling groove 503 at the top surface, measured between the first out-coupling groove-edge point and the second out-coupling groove-edge point, is $w_2$, as indicated. A vertical segment 513 extends a distance $d_2$ in depth down from the first out-coupling groove-edge point to the first out-coupling groove floor point. A horizontal floor segment 515 at depth $d_2$ extends a distance $w_{h2}$ in width from the first out-coupling groove floor point to the second out-coupling groove floor point. Again as is evident from the figure, $w_{h2} < w_2$. Next, a second straight ramp segment 517 extends at an angle $\alpha_2$ from the second out-coupling groove floor point up to the second out-coupling groove-edge point at the top surface. Finally, a horizontal out-coupling groove gap segment 519 at zero depth of the top surface extends a distance $w_{g2}$ in width from the second out-coupling groove-edge point toward the first edge of the top surface (on the left in this figure).

Figure 6:
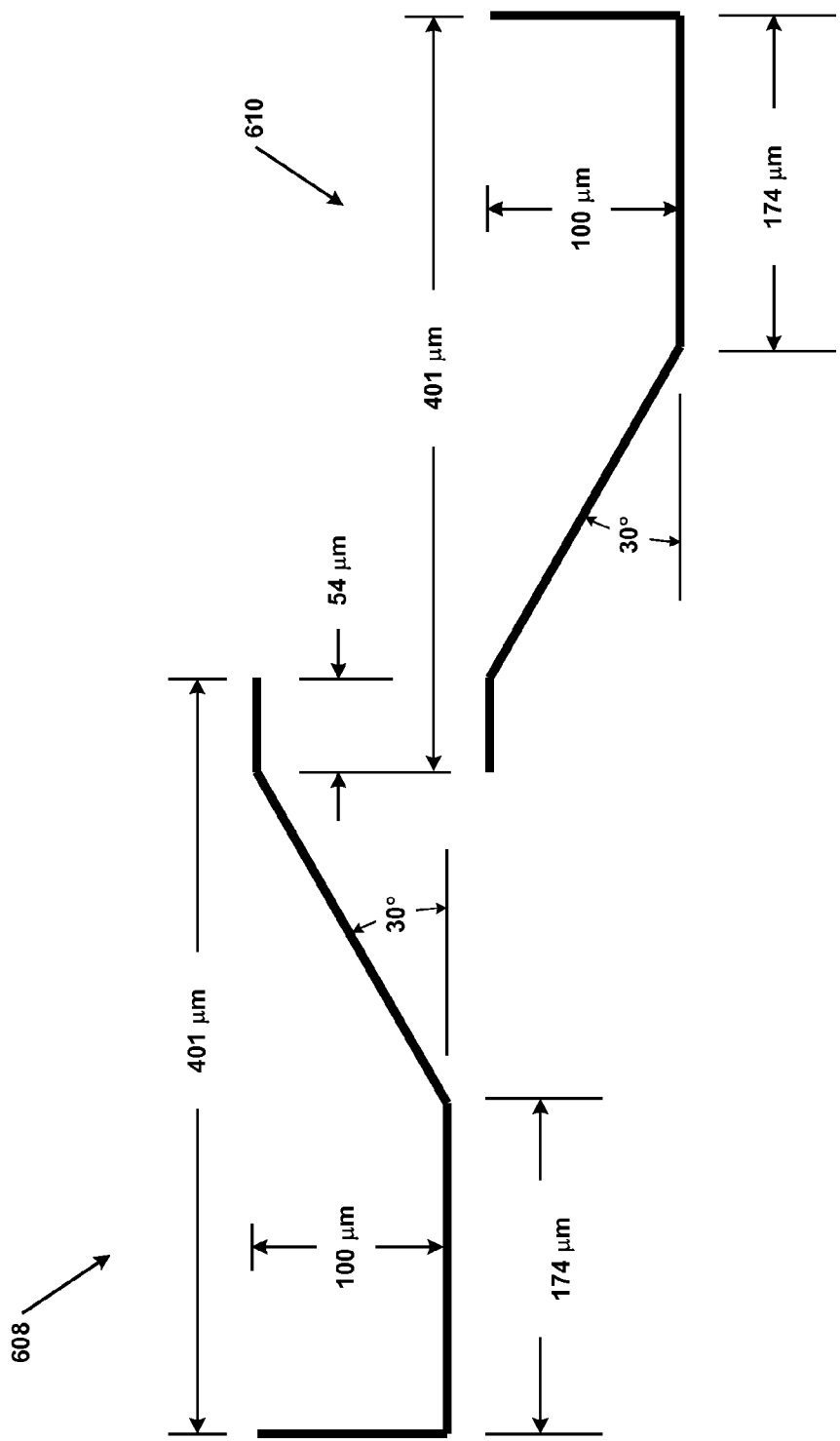
FIG. 6 is a schematic illustration of detailed shape characteristics and particular example dimensions of in-coupling and out-coupling grooves of an example embodiment of an optical waveguide.

FIG. 6 shows magnified in-coupling groove 608 and out-coupling groove 610 with particular numerical values specified for the dimensions in accordance with the example embodiment of the example waveguide 502. Specifically, $d_1=d_2=100$ μm; $w_1=w_2=347$ μm; $w_{h1}=w_{h2}=174$ μm; and $w_{g1}=w_{g2}=54$ μm. In addition $\alpha_1=\alpha_2=30°$. Referring back to FIG. 2, the lengths of the in-coupling and out-coupling grooves are $l_1=l_2=2$ cm in the example embodiment of the waveguide. With these values, and with 20 in-coupling grooves and 30 out-coupling grooves as described earlier, the width of the in-coupling region is approximately equal to 8 mm and the width of the out-coupling region is approximately equal to 12 mm. These sizes (as do $l_1=l_2=2$ cm) correspond with the illustration of FIG. 2, discussed above.

It should be understood that the particular numerical values are not the only values that could be used in the design or manufacture of an example waveguide for near-eye applications, such as a heads-up or wearable display. In addition, the lengths $l_1$ and $l_2$ do not necessarily have to be the same. Moreover, the in-coupling grooves do not even necessarily all have to the same length. Likewise, the out-coupling grooves do not even necessarily all have to the same length.

However, the example numerical values are not necessarily chosen arbitrarily. One advantage introduced by the example embodiment of employing micro-optical-sized reflecting surfaces for in-coupling and out-coupling is that the optical characteristics and properties of the example waveguide can be largely analytically determined. This, in turn, benefits the design process and enables determination of numerical values that are well-matched for particular applications and/or desired optical performance. The particular numerical values discussed above represent an example of such a determination for an example embodiment of the waveguide.

3. Example Method of Manufacture of a Waveguide with Micro-Optical Reflecting Grooves Another advantage of employing micro-optical-sized reflecting surfaces for in-coupling and out-coupling, when considered together with fabrication of the waveguide from plastic or similar material, is the ability to manufacture the example waveguide relatively simply and cheaply on a mass scale. Specifically, since plastic is moldable, the example waveguide can be produced using a molding form or molding die. Furthermore, since the reflecting elements of the example waveguide are micro-optical in scale, and thereby tens to several hundreds of times larger than the typical wavelengths of light used in example applications of interest, the operational and manufacturing size tolerances of the example waveguide and an example molding die may be less critical than those in solutions based, for instance, on diffraction.

Moreover, forming physical structures of micro-optical sizes can be achieved by known micro-manufacturing techniques. Such techniques, among possibly others, can be uniquely applied in the formation of an example embodiment of a molding die and in the manufacture of an example embodiment of the waveguide. The following discussion provides an example method for manufacture of a waveguide with micro-optical reflecting grooves, such as the example waveguide discussed above.

In accordance with an example method of manufacturing an optical waveguide, an example molding die having a shape with inverse in shape characteristics from the example waveguide is formed. Specifically, the example molding die has a base surface with a longitudinal dimension and a perpendicular lateral dimension, wherein the base surface is marked by a first edge and a second edge separated by a distance measured along the longitudinal dimension. The example molding die further has a sequence of parallel in-coupling ridges affixed to the base surface and a sequence of parallel out-coupling ridges affixed to the base surface. Each of the in-coupling and out-coupling parallel ridges has a ridge length oriented perpendicular to the longitudinal dimension, and a ridge surface with dimensions of area in a size range corresponding to micro-optical sizes. The sequence of in-coupling ridges is situated between the first and second edges, and the sequence of out-coupling ridges is situated between the sequence in-coupling ridges and the second edge.

To form the example waveguide, the example molding die is coated with a layer of optically transparent moldable waveguide material to form a molded waveguide body. For example, plastic may be heated to a molten form and layered onto the molding die. Alternatively, plastic may be heated to a softened form and pressed against the molding die. One of ordinary skill in the art would understand how to achieve these or other molding operations.

The molded waveguide body has a molded face formed against the example molding die. In addition, a flat face is formed on the molded waveguide body opposite to the base surface and separated from the base surface by a thickness. The molded face acquires a sequence of parallel in-coupling grooves that extend into the molded waveguide body. The in-coupling grooves correspond in inverse shape to the sequence of parallel in-coupling ridges. The molded face also has a sequence of parallel out-coupling grooves that extend into the molded waveguide body, and that correspond in inverse shape to the sequence of parallel out-coupling ridges.

The molded waveguide body is then removed from the example molding die, for example after the moldable waveguide material hardens and sets. Through this process, the molded waveguide body retains the molded face, the flat face, the sequence of parallel in-coupling grooves, and the sequence of parallel out-coupling grooves. Additionally, other aspects of the form factor of the waveguide (e.g., forming a rectangular block, etc.) can be fashioned, either while the layer material is still on the molding die, or after the molded waveguide body is removed from the die (e.g., by one or another cutting or trimming methods).

Next, a reflective coating is applied to an in-coupling surface of each in-coupling groove of the sequence of parallel in-coupling grooves. The reflectively-coated in-coupling surface of each in-coupling groove has dimensions of area that make it non-diffractive (i.e., in a size range corresponding to micro-optical sizes), and corresponds to the in-coupling reflective surfaces the example waveguide discussed above.

Finally, a reflective coating is applied to an out-coupling surface of each out-coupling groove of the sequence of parallel out-coupling grooves. The reflectively-coated out-coupling surface of each out-coupling groove also has dimensions of area that make it non-diffractive (i.e., in a size range corresponding to micro-optical sizes), and corresponds to the out-coupling reflective surfaces the example waveguide discussed above.

Figure 7:
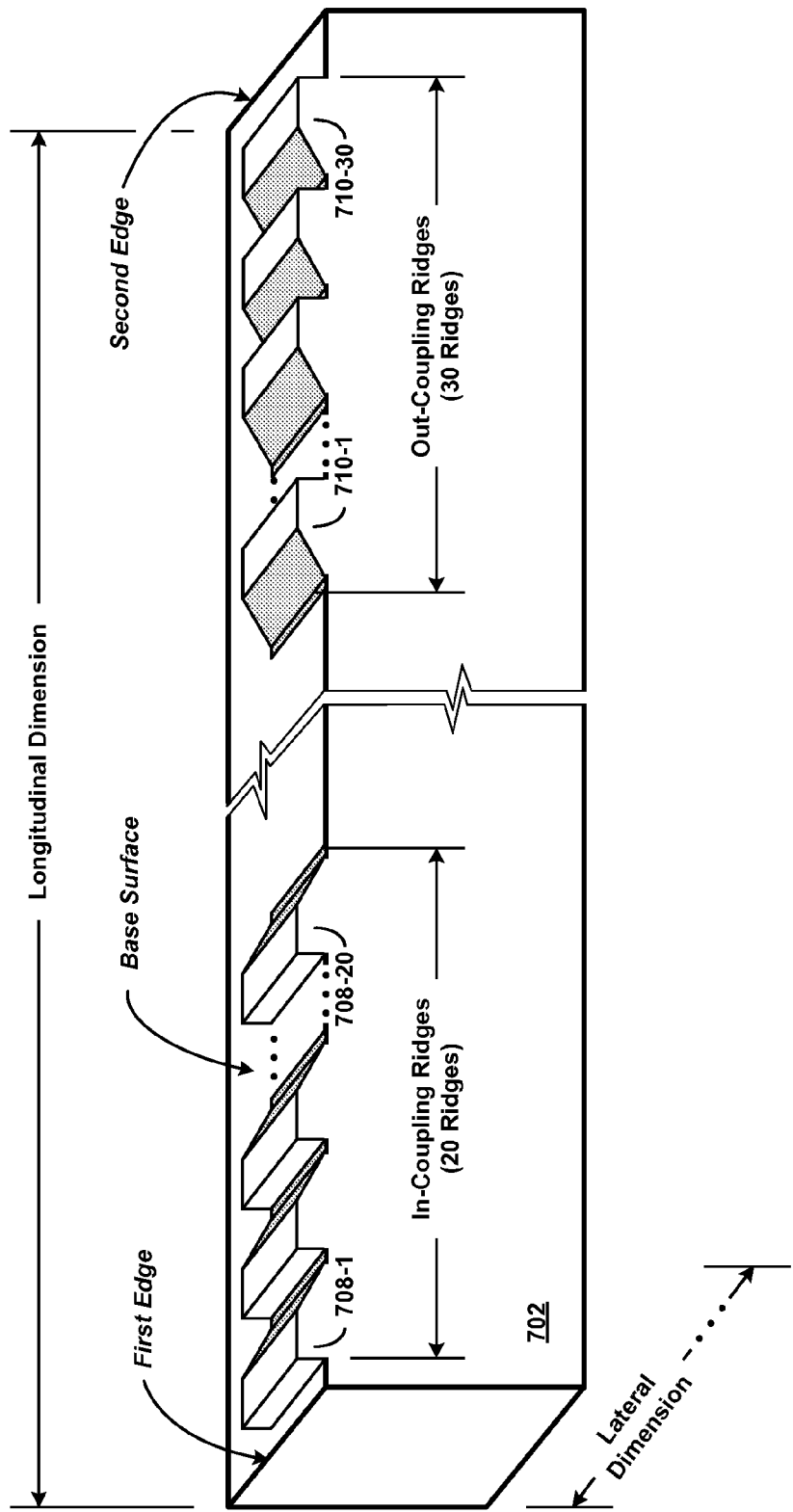
FIG. 7 is a three-dimensional rendering of a conceptual illustration of an example molding die configured for use in an example method of manufacturing an optical waveguide according to the example embodiment.

FIG. 7 depicts an example molding die 702 in the form of a cross-section rendered in three dimensions. In accordance with the example embodiment, the form factor of the example molding die 702 is a regular rectangular block having (as indicated in the figure) a base surface with a base longitudinal dimension and a perpendicular base surface lateral dimension. The base surface is marked by a first edge (on the left in the figure) and a second edge (on the right in the figure) separated by the longitudinal dimension. The full size of the base surface lateral dimension extends beyond the width of the cutaway section of the example molding die 702. In addition, in order to fit molding die 702 in the figure, the base surface longitudinal dimension of the molding die block is abbreviated, as represented by broken-edge lines in the base surface and cutaway surface.

In accordance with the example embodiment, the shape of the sequences of parallel in-coupling and out-coupling ridges are the inverse shape of in-coupling and out-coupling grooves of the example waveguide 302 shown in FIG. 3. In further accordance with the example embodiment, there are 20 in-coupling ridges, and 30 out-coupling ridges. In order to fit the enlarged view of the ridges in the figure, only four of each of the in-coupling ridges and out-coupling ridges are shown, with ellipses representing the remaining (but not shown) ridges. For the sake of brevity in the figure, only the first in-coupling ridge 708-1 and last in-coupling ridge 708-20 are labeled. Similarly, only the first out-coupling ridge 710-1 and last out-coupling ridge 710-30 are labeled.

As illustrated in FIG. 7, each ridge has, in cross-section, a vertical wall that extends in height from the base surface to a ridge plateau. The plateau extends horizontally toward a slope that extends back down to the base surface. An inter-ridge gap then separates the slope-bottom of one ridge from the wall of the next ridge. In further accordance with the example embodiment, and also as illustrated in the figure, the in-coupling ridges and the out-coupling ridges have the same cross-sectional shape, except reflected about a plane perpendicular to the base surface longitudinal dimension.

Figure 8:
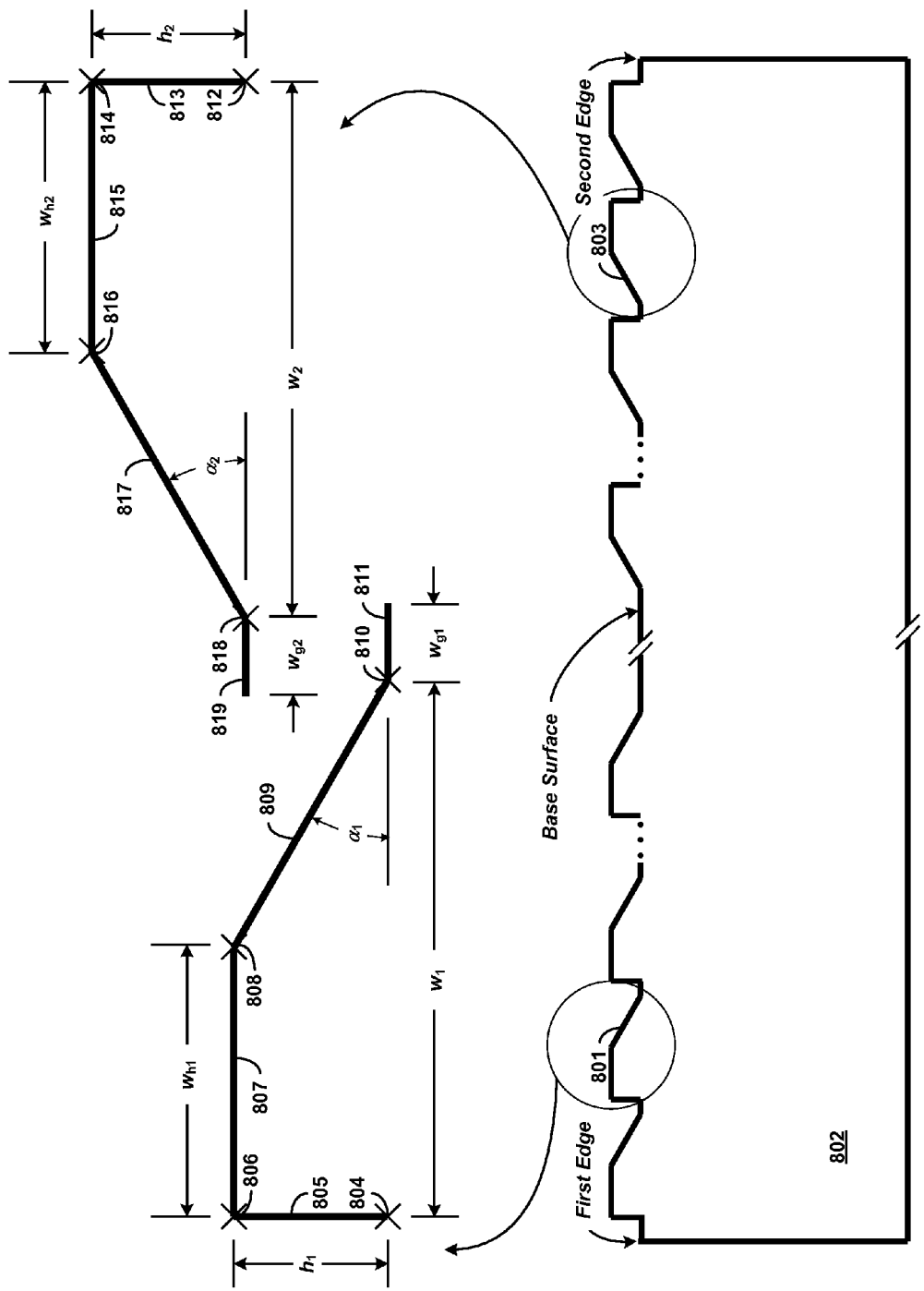
FIG. 8 illustrates detailed shape characteristics and parameterized dimensions of an example molding die for use in an example method of manufacturing an optical waveguide according to the example embodiment.

FIG. 8 illustrates a more detailed view of the cross-sectional shapes of the in-coupling and out-coupling ridges of the example molding die 802. In the cross-sectional view of the molding die 802, the broken lines in the base and bottom surfaces, and the ellipses in place of omitted ridges represent an abbreviation in the base surface longitudinal dimension, purely for purposes of fitting the diagram on the page. On the left of FIG. 8, a representative in-coupling ridge 801, highlighted within a circle, is shown in a magnified view. On the right, a representative a representative out-coupling ridge 803, similarly highlighted within a circle, is shown in a magnified view. In the magnified views of FIG. 8, specific measurements of the cross-section elements of the ridges are parameterized; particular numerical values are discussed later.

The magnified ridges 801, 803 are each described in terms of four line segments and the vertices at which the line segments are connected. For purposes of the discussion herein, various fiducial points along the cross-section are marked by "X"s and define the following descriptive terms. For the in-coupling ridge 801, fiducial points 804 and 810 mark a first vertical-base point and a first slope-base point, respectively; and fiducial points 806 and 808 mark a first vertical-plateau point and a first slope-plateau floor point, respectively. For the out-coupling ridge 803, fiducial points 812 and 818 mark a second vertical-base point and a second slope-base point, respectively; and fiducial points 814 and 816 mark a second vertical-plateau point and a second slope-base point, respectively. With these definitions, the cross-sectional shape of the ridges can be described as follows.

The width of the in-coupling ridge 801 at the base surface, measured between the first vertical-base point and the first slope-base point, is $w_1$, as indicated. A vertical segment 805 extends a distance $h_1$ in height up from the first vertical-base point to the first vertical-plateau point. A horizontal plateau segment 807 at height $h_1$ extends a distance $w_{h1}$ in width from the first vertical-plateau point to the first slope-plateau point. As is evident from the figure, $w_{h1} < w_1$. Next, a first straight slope segment 809 extends at an angle $\alpha_1$ from the first slope-plateau point down to the first slope-base point at the base surface. Finally, a horizontal first ridge gap segment 811 at zero height of the base surface extends a distance $w_{g1}$ in width from the first slope-base point toward the second edge of the base surface (on the right in this figure).

A similar description applies to the out-coupling ridge 803. Namely, width of the out-coupling ridge 803 at the base surface, measured between the second vertical-base point and the second slope-base point, is $w_2$, as indicated. A vertical segment 813 extends a distance $h_2$ in height up from the second vertical-base point to the second vertical-plateau point. A horizontal plateau segment 815 at height $h_2$ extends a distance $w_{h2}$ in width from the second vertical-plateau point to the second slope-plateau point. Again as is evident from the figure, $w_{h2} < w_2$. Next, a second straight slope segment 817 extends at an angle $\alpha_2$ from the second slope-plateau point down to the second slope-base point at the base surface. Finally, a horizontal second ridge gap segment 819 at zero height of the base surface extends a distance $w_{g2}$ in width from the second slope-base point toward the first edge of the base surface (on the left in this figure).

In accordance with the example embodiment, the parameterized values referenced in FIG. 8 are defined with numerical values for dimensions similar to those of the in-coupling and out-coupling grooves 608, 610 illustrated in FIG. 6. Specifically, for the example embodiment of the molding die, $h_1=h_2=100$ μm; $w_1=w_2=347$ μm; $w_{h1}=w_{h2}=174$ μm; $w_{g1}=w_{g2}=54$ μm; and $\alpha_1=\alpha_2=30°$. In addition, the length, $l_1$, of the in-coupling ridges and the length, $l_2$, of the out-coupling ridges are $l_1=l_2=2$ cm in the example embodiment of the molding die. With these values, and with 20 in-coupling ridges and 30 out-coupling ridges, as described earlier, the width of the in-coupling region is approximately equal to 8 mm and the width of the out-coupling region is approximately equal to 12 mm.

As with the example waveguide, the dimensions of the molding die specified above are provided by way of example, and other values could be used. In addition, the lengths $l_1$ and $l_2$ of the in-coupling and out-coupling ridges do not necessarily have to be the same. Moreover, the in-coupling ridges do not even necessarily all have to the same length. Likewise, the out-coupling ridges do not even necessarily all have to the same length.

FIG. 9(a)-(f) is a schematic illustration of the example method of manufacturing a waveguide having micro-optical reflecting grooves, such as the one described above. The figure includes six parts (a)-(f) of cross-sectional view, arranged from top to bottom. In FIG. 9(a) at the top of the figure, an example molding die 902 is coated with a layer 904-a of moldable waveguide material. In FIG. 9(b), the layer 904-b is fashioned into the form factor of the example waveguide (e.g., a regular rectangular block), including a planar surface parallel to the molded face form against the example molding die 902. In FIG. 9(c), the molded waveguide body 904-c is removed from the molding die. As noted above, the molded waveguide body retains the molded shape, including the in-coupling and out-coupling ridges.

The reflective metal is next deposited onto the appropriate surfaces of the grooves in order to form the reflective surfaces of the in-coupling and out-coupling grooves. In accordance with the example method, the deposition can be achieved using electron-beam evaporation with a shadow mask. As is known in the art, this procedure involves placing a target object in a vacuum chamber in which a surface of a metal ingot is continuously and gradually vaporized by an electron beam. The vaporized metal then adheres to exposed surfaces of the target object, thereby resulting in a very thin layer (e.g., 0.1 μm) of the metal. A shadow mask is placed over portions of the surface of the target object to prevent those portions from being coated. The process can further include techniques to direct the vaporized metal to bias deposition toward particular surfaces of the target object. Electron-beam evaporation or shadow-mask evaporation is a well-known technique, and not describe further herein.

In FIG. 9(d), shadow-mask evaporation is used a first time to deposit a thin layer of reflective metal on the ramp and inter-gap surfaces of the in-coupling grooves of the example waveguide 904-d. As schematically represented in the figure, a shadow mask 906 is placed over the out-coupling grooves of the example waveguide 904-d, and a vaporization 907 of a reflective metal is directed at an angle toward the in-coupling grooves. The angle is such that only the ramp and inter-gap surfaces of the in-coupling grooves are exposed, and consequently only those surfaces receive a deposition layer of the reflective metal. The wall (vertical) and floor segments of each groove remain unexposed, and do not get coated.

In FIG. 9(e), shadow-mask evaporation is used a second time to deposit a thin layer of the reflective metal on the ramp and inter-gap surfaces of the out-coupling grooves of the example waveguide 904-e. Note that the in-coupling grooves of the example waveguide 904-e have reflective metal on their ramp and inter-gap surfaces from the previous step, indicated schematically by thick dark lines on those surfaces. As schematically represented in the FIG. 9(e), a shadow mask 908 is placed over the now-coated in-coupling grooves of the example waveguide 904-e, and a vaporization 909 of a reflective metal is directed at an angle toward the out-coupling grooves. Again, the angle is such that only the ramp and inter-gap surfaces of the out-coupling grooves are exposed, and consequently only those surfaces receive a deposition layer of the reflective metal. The wall (vertical) and floor segments of each groove remain unexposed, and do not get coated.

In accordance with the example embodiment, the reflective metal is aluminum. It will be appreciated that other metals can be applied, and that multiple different metals can used in electron-beam evaporation, such that the deposited layer can be a mix or alloy of the multiple metals.

The waveguide 904-f is shown in finished form in FIG. 9(f). Now, the in-coupling grooves have in-coupling reflective surfaces 910, and the out-coupling grooves have in-coupling reflective surfaces 912, indicated schematically by thick dark lines on those surfaces. It will be appreciated that a similar procedure can be used to apply a reflective coating to the top and/or bottom surface of the example waveguide in a region between the in-coupling and out-coupling regions, such as depicted as layers 410 and 412 in FIG. 4.

In further accordance with the example method, the example molding die 902 can be used repeatedly to make multiple, identical copies of the example waveguide. In addition, the example molding die could be part of an example compound molding die that includes multiple, identical copies of the example molding die. The example compound molding die could be used to simultaneously manufacture multiple, identical copies of the example waveguide, for instance by coating the example compound molding die with a layer of optically transparent moldable waveguide material to form multiple molded waveguide bodies, and separating resulting multiple waveguide bodies from the compound molding die. It will be appreciated that other modifications and/or additions the example method described above can be made, while still remaining within the spirit and scope of the example embodiments disclosed herein.

FIG. 10(a)-(f) is a schematic illustration of an example method of forming an example molding die, such as the one described above, according to a process of ultraviolet (UV) lithography. UV lithography is a well-know procedure, and described herein with sufficient detail for understanding by one of ordinary skill in the art. The figure includes six parts (a)-(f) of cross-sectional view, arranged from top to bottom. FIG. 10(a) at the top of the figure shows a substrate 1002 used as a base for the example molding die. The top surface of the substrate 1002 corresponds to the base surface of the example molding die. For purposes of illustration the substrate is displayed as a grey rectangle. In accordance with the example embodiment, the substrate could be silicon in the form of a wafer, for example.

In FIG. 10(b) a photo-resist layer 1004 (displayed as a white rectangle for purposes of illustration) is coated onto the substrate 1002. The photo-resist layer typically comprises a UV-sensitive polymer that can be dissolved and washed away upon exposure to an appropriate solvent. As is known, a volume of the polymer that is first exposed to UV light becomes resistant to the solvent, and thus becomes a permanent structure after the un-exposed volume(s) of the polymer are dissolved and washed away.

In FIG. 10(c), one or more beams of UV light 1005 are directed at an angle corresponding to the slope of the in-coupling ridges. As indicated schematically by the dark grey regions in the polymer layer 1004 in FIG. 10(c), the beams result in selective exposure of particularly shaped and particularly located volumes within the polymer layer 1004.

In FIG. 10(d), one or more beams of UV light 1007 are directed at an angle corresponding to the slope of the out-coupling ridges. As again indicated schematically by the dark grey regions in the polymer layer 1004 in FIG. 10(d), the beams result in selective exposure of different volumes within the polymer layer 1004.

In FIG. 10(e), one or more beams of UV light 1009 are directed vertically to create exposed volumes within the polymer layer 1004 that correspond to the plateau regions of the ridges. Again, the exposed volumes are shown in dark grey.

Finally, in FIG. 10(f), the polymer layer is dissolved and washed away using an appropriate solvent. However, the selectively exposed volumes of the polymer do not dissolve, but remain affixed to the substrate 1002, thereby forming the sequence in-coupling ridges 1008 and the sequence of out-coupling ridges 1010. The result of this process is an example molding die 1006, as shown in the FIG. 10(f) of FIG. 10.

It will be appreciated that UV lithography is only one possible method for forming or fashioning an example molding die that can be used in the manufacture of a molded waveguide having micro-optical reflecting structures, such as the example waveguide discussed above. Another possible method could be precision micro-machining of a durable metal, such as stainless steel, or the like. Other methods of could be devised as well.

It should be understood that the values specified herein for the various dimensions and angles of the grooves and ridges above (e.g., $d_1$, $d_2$; $w_1$, $w_2$; $w_{h1}$, $w_{h2}$; $w_{g1}$, $w_{g2}$; and $\alpha_1$, $\alpha_2$), as well as for other physical features of the example waveguide, are provided by way example, and that other values could be used. Furthermore, the use herein of a mathematical equality to specify a relationship between two or more parameterized dimensions or the value of dimension, as for instance in the expression "$w_1=w_2=347$ μm," should be understood as providing a design specification. It will be appreciated that in practice, there may be some degree of imprecision of any one or more of these dimensions or angles as a result, for example, of the manufacturing process. Accordingly, the use an equal sign ("=") in the context of example design specifications herein should be understood to include meaning "approximately equal to." Likewise, the phrase "approximately equal to" (or the like) should be understood as corresponding to design specification provided in recognition of practical imprecision(s) introduced in the transformation of design specification into practice.

In the above discussions and explanations, the terms "first" and "second" as applied to "edges," "sides," and so on, are generally used as identifying labels, and not meant to imply any numerical ordering (although a numerical ordering is not necessarily excluded).

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed:

1. An optical waveguide comprising:
a waveguide body having a top surface and an opposite bottom surface, a first side and an opposite second side;
a plurality of in-coupling non-diffractive reflecting surfaces embedded in the waveguide body at the top surface, each being oriented to reflect light that enters the waveguide body through the bottom surface onto one or more internal paths inside the waveguide body and toward the second side; and
a plurality of out-coupling non-diffractive reflecting surfaces embedded in the waveguide body at the top surface, each being oriented to reflect light incident from the one or more internal paths onto one or more exit paths that exit the waveguide body through the bottom surface,
wherein the plurality of in-coupling non-diffractive reflecting surfaces comprises a sequence of parallel in-coupling grooves formed in the top surface and situated between the first side and the second side, each in-coupling groove having a non-diffractive reflecting surface,
and wherein the plurality of out-coupling non-diffractive reflecting surfaces comprises a sequence of parallel out-coupling grooves formed in the top surface parallel to the sequence of in-coupling grooves and situated between the sequence of in-coupling grooves and the second side, each out-coupling groove having a non-diffractive reflecting surface.

2. The optical waveguide of claim 1, wherein the non-diffractive surface of each in-coupling groove comprises an in-coupling surface having dimensions in comparison with the wavelengths of light that causes light to reflect non-diffractively from the in-coupling surface,
and wherein the non-diffractive out-coupling surface of each out-coupling groove comprises an out-coupling surface having dimensions in comparison with the wavelengths of light that causes light to reflect non-diffractively from the surface the out-coupling.

3. An optical waveguide comprising:
an optically-transparent waveguide body having a top surface and an opposite bottom surface, a first side and an opposite second side;
a sequence of parallel in-coupling grooves formed in the top surface of the waveguide body and situated between the first side and the second side, each in-coupling groove having an in-coupling reflecting surface with dimensions in comparison with the wavelengths of light that renders the in-coupling reflecting surface non-diffractively reflective, and each in-coupling reflecting surface being oriented to reflect light that enters the waveguide body through the bottom surface onto one or more internal paths inside the waveguide body and toward the second side; and
a sequence of parallel out-coupling grooves formed in the top surface of the waveguide body parallel to the sequence of in-coupling grooves and situated between the sequence of in-coupling grooves and the second side, each out-coupling groove having an out-coupling reflecting surface with dimensions in comparison with the wavelengths of light that renders the out-coupling reflecting surface non-diffractively reflective, and each out-coupling reflecting surface being oriented to reflect light incident from the one or more internal paths to one or more exit paths that exit the waveguide body through the bottom surface.

4. The optical waveguide of claim 3, wherein the waveguide body is a rectangular block.

5. The optical waveguide of claim 3, wherein the waveguide body comprises a transparent solid material that is selected from the group consisting of polydimethylsiloxane and acrylic.

6. The optical waveguide of claim 3, wherein each in-coupling reflecting surface has dimensions in a size range corresponding to micro-optical sizes,
and wherein each out-coupling reflecting surface has dimensions in a size range corresponding to micro-optical sizes.

7. The optical waveguide of claim 3, wherein each in-coupling groove has an in-coupling cross-sectional shape comprising:
a first in-coupling groove-edge point and a second in-coupling groove-edge point separated by a horizontal width $w_1$ along the top surface, wherein the first in-coupling groove-edge point is closer than the second in-coupling groove-edge point to the first side of the waveguide body;
a vertical segment extending a depth $d_1$ down from the first in-coupling groove-edge point at the top surface to a first in-coupling groove floor point;
a horizontal floor segment at depth $d_1$ extending a distance $w_{h1}$ from the first in-coupling groove floor point to a second in-coupling groove floor point, wherein $w_{h1}<w_1$, and the second in-coupling floor point is closer than the first in-coupling floor point to the second side of the waveguide body;
a first straight ramp segment extending at an angle from the second in-coupling groove floor point to the second in-coupling groove-edge point at the top surface; and
a horizontal in-coupling groove gap segment extending a distance $w_{g1}$ along the top surface from the second in-coupling groove-edge point toward the second side of the waveguide body.

8. The optical waveguide of claim 7, wherein each out-coupling groove has an out-coupling cross-sectional shape comprising:

a first out-coupling groove-edge point and a second out-coupling groove-edge point separated by a horizontal width $w_2$ along the top surface, wherein the first out-coupling groove-edge point is closer than the second out-coupling groove-edge point to the second side of the waveguide body;

a vertical segment extending a depth $d_2$ down from the first out-coupling groove-edge point at the top surface to a first out-coupling groove floor point;

a horizontal floor segment at depth $d_2$ extending a distance $w_{h2}$ from the first out-coupling groove floor point to a second out-coupling groove floor point, wherein $w_{h2} < w_2$, and the second out-coupling floor point is closer than the first out-coupling floor point to the first side of the waveguide body;

a second straight ramp segment extending at an angle from the second out-coupling groove floor point to the second out-coupling groove-edge point at the top surface; and a horizontal out-coupling groove gap segment extending a distance $w_{g2}$ along the top surface from the second out-coupling groove-edge point toward the first side of the waveguide body.

9. The optical waveguide of claim 8, wherein each in-coupling groove has a length $l_1$ and each out-coupling groove has a length $l_2$, and wherein $l_1 = l_2$, $d_1 = d_2$, $w_1 = w_2$, $w_{h1} = w_{h2}$, and $w_{g1} = w_{g2}$.

10. The optical waveguide of claim 9, wherein $l_1$ is approximately equal to 2 cm, $d_1$ is approximately equal to 100 microns (μm), $w_1$ is approximately equal to 347 μm, $w_{h1}$ is approximately equal to 174 μm, and $w_{g1}$ is approximately equal to 54 μm, wherein the first straight ramp makes an angle approximately equal to 30° with a line parallel to the in-coupling groove gap segment, and wherein the second straight ramp makes an angle approximately equal to 30° with a line parallel to the out-coupling groove gap segment.

11. The optical waveguide of claim 10, wherein the sequence of parallel in-coupling grooves has 20 in-coupling grooves and a total in-coupling width measured along a direction perpendicular to the length of each in-coupling groove, the total in-coupling width being approximately equal to 8 mm, wherein the sequence of parallel out-coupling grooves has 30 out-coupling grooves and a total out-coupling width measured along a direction perpendicular to the length of each out-coupling groove, the total out-coupling width being approximately equal to 12 mm, and wherein the sequence of parallel in-coupling grooves and the sequence of parallel out-coupling grooves are separated in by a distance approximately equal to 33 mm.

12. The optical waveguide of claim 8, wherein each in-coupling groove has an in-coupling groove length $l_1$ and each out-coupling groove has an out-coupling groove length $l_2$, wherein the in-coupling reflecting surface of each in-coupling groove comprises (i) the first straight ramp extended a distance $l_1$ along a direction of the in-coupling groove length plus (ii) the in-coupling groove gap segment extended a distance $l_1$ along the direction of the in-coupling groove length, the in-coupling reflecting surface further having a first thin layer of reflective metal deposited thereon, and wherein the out-coupling reflecting surface of each out-coupling groove comprises (i) the second straight ramp extended a distance $l_2$ along a direction of the out-coupling groove length plus (ii) the out-coupling groove gap segment extended a distance $l_2$ along the direction of the out-coupling groove length, the out-coupling reflecting surface further having a second thin layer of reflective metal deposited thereon.

13. The optical waveguide of claim 12, wherein the reflective metal is aluminium, and wherein the first thin layer and the second thin layer both have a thickness approximately equal to 0.1 microns (μm).

14. The optical waveguide of claim 3, wherein the in-coupling reflecting surface of each in-coupling groove comprises at least a portion of a total surface of the in-coupling groove having a first thin layer of reflective metal deposited thereon, and wherein the out-coupling reflecting surface of each out-coupling groove comprises at least a portion of a total surface of the out-coupling groove having a second thin layer of reflective metal deposited thereon.

15. The optical waveguide of claim 3, wherein at least one of the one or more internal paths is a path of total internal reflection within the waveguide body.

16. The optical waveguide of claim 3, wherein the light that enters the waveguide body enters the waveguide body on one or more entrance paths that are substantially normal to the bottom surface, and wherein the one or more exit paths are substantially normal to the bottom surface.

17. A method of manufacturing an optical waveguide, the method comprising:

forming a molding die comprising a base surface with a first edge and a second edge, the molding die further comprising a sequence of parallel in-coupling ridges affixed to the base surface between the first edge and the second edge, and a sequence of parallel out-coupling ridges affixed to the base surface parallel to the sequence of in-coupling ridges and situated between the sequence of in-coupling ridges and the second edge, each of the in-coupling ridges and each of the out-coupling ridges having a ridge surface with dimensions that, relative to the wavelengths of light, correspond in size to a non-diffractive reflecting surface;

coating the molding die with a layer of optically transparent moldable waveguide material to form a molded waveguide body, the molded waveguide body having a molded face formed against the molding die and a flat face opposite the base surface, wherein the molded face has a sequence of parallel in-coupling grooves extending into the molded waveguide body and corresponding in inverse shape to the sequence of parallel in-coupling ridges, and a sequence of parallel out-coupling grooves extending into the molded waveguide body and corresponding in inverse shape to the sequence of parallel out-coupling ridges;

removing the molded waveguide body from the molding die, the removed molded waveguide body retaining the molded face, the flat face, the sequence of parallel in-coupling grooves, and the sequence of parallel out-coupling grooves;

applying a reflective coating to an in-coupling surface of each in-coupling groove of the sequence of parallel in-coupling grooves, the reflectively-coated in-coupling surface having dimensions in comparison with the wavelengths of light that renders the reflectively-coated in-coupling reflecting surface non-diffractively reflective, and being oriented to reflect light that enters the waveguide body through the flat face onto one or more internal paths inside the waveguide body and toward the sequence of parallel out-coupling grooves; and applying a reflective coating to an out-coupling surface of each out-coupling groove of the sequence of parallel out-coupling grooves, the reflectively-coated out-coupling surface having dimensions in comparison with the wavelengths of light that renders the reflectively-coated out-coupling reflecting surface non-diffractively reflective, and being oriented to reflect light incident from the one or more internal paths to one or more exit paths that exit the waveguide body through the flat face.

18. The method of claim 17, wherein the optically transparent moldable waveguide material is selected from the group consisting of polydimethylsiloxane and acrylic, and wherein coating the molding die with the layer of optically transparent moldable waveguide material to form the molded waveguide body comprises forming the layer into a substantially rectangular block.

19. The method of claim 17, wherein forming the molding die comprises:

coating a surface of a substrate with a photoresist layer, the photoresist layer having a layer thickness measured perpendicular to the surface, the layer thickness at least as large as a maximum height of the parallel in-coupling and out-coupling ridges;

employing ultraviolet lithography to remove all of the photoresist layer from the surface except for the sequence of parallel in-coupling ridges and the sequence of parallel out-coupling ridges.

20. The method of claim 17, wherein each in-coupling ridge has a first cross-sectional shape comprising:

a first vertical-base point and a first slope-base point separated by a horizontal width $w_1$ along the base surface, wherein the first vertical-base point is closer than the first slope-base point to the first edge of the base surface;

a vertical segment extending a height $h_1$ up from the first vertical-base point at the base surface to a first vertical-plateau point;

a horizontal plateau segment at height $h_1$ extending a distance $w_{h1}$ from the first vertical-plateau point to a first slope-plateau point, wherein $w_{h1} < w_1$, and the first slope-plateau point is closer than the first vertical-plateau point to the second edge;

a first straight slope segment extending at an angle from the first slope-plateau point to the first slope-base point at the base surface; and a horizontal first ridge gap segment extending a distance $w_{g1}$ along the base surface from the first slope-base point toward the second edge of the base surface.

21. The method of claim 20, wherein each out-coupling ridge has a second cross-sectional shape comprising:

a second vertical-base point and a second slope-base point separated by a horizontal width $w_2$ along the base surface, wherein the second vertical-base point is closer than the second slope-base point to the second edge of the base surface;

a vertical segment extending a height $h_2$ up from the second vertical-base point at the base surface to a second vertical-plateau point;

a horizontal plateau segment at height $h_2$ extending a distance $w_{h2}$ from the second vertical-plateau point to a second slope-plateau point, wherein $w_{h2} < w_2$, and the second slope-plateau point is closer than the second vertical-plateau point to the first edge;

a second straight slope segment extending at an angle from the second slope-plateau point to the second slope-base point at the base surface; and a horizontal second ridge gap segment extending a distance $w_{g2}$ along the base surface from the second slope-base point toward the first edge of the base surface.

22. The method of claim 21, wherein each in-coupling ridge and each out-coupling ridge has a length l, wherein $h_1 = h_2$, $w_1 = w_2$, $w_{h1} = w_{h2}$, and $w_{g1} = w_{g2}$, wherein l is approximately equal to 2 cm, $h_1$ is approximately equal to 100 microns (μm), $w_1$ is approximately equal to 347 μm, $w_{h1}$ is approximately equal to 174 μm, and $w_{g1}$ is approximately equal to 54 μm, wherein the first straight slope makes an angle approximately equal to 30° with a line parallel to the first ridge gap segment, and wherein the second straight slope makes an angle approximately equal to 30° with a line parallel to the second ridge gap segment.

23. The method of claim 21, wherein the sequence of parallel in-coupling ridges has 20 in-coupling ridges and a total in-coupling width measured along a direction perpendicular to the length of each in-coupling ridge, the total in-coupling width being approximately equal to 8 mm, wherein the sequence of parallel out-coupling ridges has 30 out-coupling ridges and a total out-coupling width measured along a direction perpendicular to the length of each out-coupling ridge, the total out-coupling width being approximately equal to 12 mm, and wherein the sequence of parallel in-coupling ridges and the sequence of parallel out-coupling ridges are separated in by a distance approximately equal to 33 mm.

24. The method of claim 21, wherein each in-coupling ridge has an in-coupling ridge length $l_1$ and each out-coupling ridge has an out-coupling ridge length $l_2$, wherein the in-coupling surface of each in-coupling groove corresponds in inverse shape to (i) the first straight slope extended a distance $l_1$ along a direction of the in-coupling ridge length plus (ii) the first ridge gap segment extended a distance $l_1$ along the direction of the in-coupling ridge length, wherein the out-coupling surface of each out-coupling groove corresponds in inverse shape to (i) the second straight slope extended a distance $l_2$ along a direction of the out-coupling ridge length plus (ii) the second ridge gap segment extended a distance $l_2$ along the direction of the out-coupling ridge length, wherein applying the reflective coating to the in-coupling surface of each in-coupling groove comprises depositing a first thin layer of reflective metal to the in-coupling surface of each in-coupling groove, and wherein applying the reflective coating to the out-coupling surface of each out-coupling groove comprises depositing a second thin layer of reflective metal to the out-coupling surface of each out-coupling groove.

25. The method of claim 24, wherein the reflective metal is aluminium, and wherein the first thin layer and the second thin layer both have a thickness approximately equal to 0.1 microns (μm).

26. The method of claim 17, wherein forming the molding die comprises forming a compound molding die comprising a plurality of molding dies each substantially identical to the molding die, and wherein coating the molding die with the layer of optically transparent moldable waveguide material to form the molded waveguide body comprises coating each of the plurality of molding dies of the compound molding die with the optically transparent moldable waveguide material.

27. The method of claim 17, further comprising:
subsequent to removing the molded waveguide body from the molding die, reusing the molding die to manufacture an additional optical waveguide, wherein reusing the molding die to manufacture the additional optical waveguide comprises:
coating the molding die with an additional layer of optically transparent moldable waveguide material to form an additional molded waveguide body;
removing the additional molded waveguide body from the molding die, the removed additional molded waveguide body having a substantially identical shape to the removed molded waveguide body, including substantially identical in-coupling grooves each with an in-coupling surface, and out-coupling grooves each with an out-coupling surface; and
applying a reflective coating to each in-coupling surface and to each out-coupling surface of the removed additional molded waveguide body.

28. A molding die for manufacturing at least one optical waveguide, the molding die comprising:
a base surface with a first edge and a second edge;
a sequence of parallel in-coupling ridges affixed to the base surface between the first edge and the second edge, and a sequence of parallel out-coupling ridges affixed to the base surface parallel to the sequence of in-coupling ridges and situated between the sequence of in-coupling ridges and the second edge, each of the in-coupling ridges and each of the out-coupling ridges having a ridge surface with dimensions that, relative to the wavelengths of light, correspond in size to a non-diffractive reflecting surface,
wherein the molding die is configured to imprint a shape into a layer of optically transparent moldable waveguide material, the shape comprising an inverse shape of the base surface, an inverse shape of the sequence of parallel in-coupling ridges, and an inverse shape of the sequence of parallel out-coupling ridges, and the layer, including the imprinted shape, comprising an optical waveguide,
wherein the at least one optical waveguide is characterized by (i) an optically-transparent waveguide body having a top surface and an opposite bottom surface, a first side and an opposite second side, and (ii) a sequence of parallel in-coupling grooves and a parallel sequence of parallel out-coupling grooves formed in the solid material of the waveguide body at the top surface, each in-coupling groove having an in-coupling reflecting surface with dimensions in comparison with the wavelengths of light that renders the in-coupling reflecting surface non-diffractively reflective, and each in-coupling reflecting surface being oriented to reflect light that enters the waveguide body through the bottom surface onto one or more internal paths inside the waveguide body and toward the second side, and each out-coupling groove having an out-coupling reflecting surface with dimensions in comparison with the wavelengths of light that renders the out-coupling reflecting surface non-diffractively reflective, and each out-coupling reflecting surface being oriented to reflect light incident from the one or more internal paths to one or more exit paths that exit the waveguide body through the bottom surface,
wherein the base surface of the molding die corresponds in inverse shape to the top surface of the waveguide body, wherein and the affixed sequence of parallel in-coupling ridges corresponds in inverse shape to the sequence of parallel in-coupling grooves,
and wherein and the affixed sequence of parallel out-coupling ridges corresponds in inverse shape to the sequence of parallel out-coupling grooves.

29. The molding die of claim 28, wherein each in-coupling ridge has a first cross-sectional shape comprising:
a first vertical-base point and a first slope-base point separated by a horizontal width $w_1$ along the base surface, wherein the first vertical-base point is closer than the first slope-base point to the first edge of the base surface;
a vertical segment extending a height $h_1$ up from the first vertical-base point at the base surface to a first vertical-plateau point;
a horizontal plateau segment at height $h_1$ extending a distance $w_{h1}$ from the first vertical-plateau point to a first slope-plateau point, wherein $w_{h1}<w_1$, and the first slope-plateau point is closer than the first vertical-plateau point to the second edge;
a first straight slope segment extending at an angle from the first slope-plateau point to the first slope-base point at the base surface; and
a horizontal first ridge gap segment extending a distance $w_{g1}$ along the base surface from the first slope-base point toward the second edge of the base surface.

30. The molding die of claim 29, wherein each out-coupling ridge has a second cross-sectional shape comprising:
a second vertical-base point and a second slope-base point separated by a horizontal width $w_2$ along the base surface, wherein the second vertical-base point is closer than the second slope-base point to the second edge of the base surface;
a vertical segment extending a height $h_2$ up from the second vertical-base point at the base surface to a second vertical-plateau point;
a horizontal plateau segment at height $h_2$ extending a distance $w_{h2}$ from the second vertical-plateau point to a second slope-plateau point, wherein $w_{h2}<w_2$, and the second slope-plateau point is closer than the second vertical-plateau point to the first edge;
a second straight slope segment extending at an angle from the second slope-plateau point to the second slope-base point at the base surface; and
a horizontal second ridge gap segment extending a distance $w_{g2}$ along the base surface from the second slope-base point toward the first edge of the base surface.

31. The molding die of claim 30, wherein each in-coupling ridge and each out-coupling ridge has a length l,
wherein $h_1=h_2$, $w_1=w_2$, $w_{h1}=w_{h2}$, and $w_{g1}=w_{g2}$,
wherein l is approximately equal to 2 cm, $h_1$ is approximately equal to 100 microns (μm), $w_1$ is approximately equal to 347 μm, $w_{h1}$ is approximately equal to 174 μm, and $w_{g1}$ is approximately equal to 54 μm,
wherein the first straight slope makes an angle approximately equal to 30° with a line parallel to the first ridge gap segment,
and wherein the second straight slope makes an angle approximately equal to 30° with a line parallel to the second ridge gap segment.

32. The molding die of claim 31, wherein the sequence of parallel in-coupling ridges has 20 in-coupling ridges and a total in-coupling width measured along a direction perpendicular to the length of each in-coupling ridge, the total in-coupling width being approximately equal to 8 mm,
wherein the sequence of parallel out-coupling ridges has 30 out-coupling ridges and a total out-coupling width measured along a direction perpendicular to the length of each out-coupling ridge, the total out-coupling width being approximately equal to 12 mm,
and wherein the sequence of parallel in-coupling ridges and the sequence of parallel out-coupling ridges are separated in by a distance approximately equal to 33 mm.

* * * * *